(12) United States Patent
Kawabata et al.

(10) Patent No.: US 9,070,204 B2
(45) Date of Patent: Jun. 30, 2015

(54) MEASURING INSTRUMENT, MEASUREMENT SYSTEM, MEASUREMENT POSITION POSITIONING METHOD AND MEASUREMENT POSITION POSITIONING PROGRAM USING THE SAME

(75) Inventors: Hideki Kawabata, Tokyo (JP); Akira Kijima, Tokyo (JP)

(73) Assignee: PROSPER CREATIVE CO., LTD., Tokyo (JP)

( * ) Notice: Subject to any disclaimer, the term of this patent is extended or adjusted under 35 U.S.C. 154(b) by 0 days.

(21) Appl. No.: 14/124,141

(22) PCT Filed: Jun. 7, 2012

(86) PCT No.: PCT/JP2012/064700
§ 371 (c)(1),
(2), (4) Date: Jan. 2, 2014

(87) PCT Pub. No.: WO2012/169592
PCT Pub. Date: Dec. 13, 2012

(65) Prior Publication Data
US 2014/0185927 A1    Jul. 3, 2014

(30) Foreign Application Priority Data

Jun. 7, 2011    (JP) .................................. 2011-127080

(51) Int. Cl.
| G06K 9/36 | (2006.01) |
| G06T 7/40 | (2006.01) |
| G01J 3/50 | (2006.01) |
| G01J 3/02 | (2006.01) |

(52) U.S. Cl.
CPC . G06T 7/408 (2013.01); G01J 3/50 (2013.01); G01J 3/0291 (2013.01); G01J 3/0278 (2013.01); G01J 3/0264 (2013.01); G01J 3/0289 (2013.01); G01J 3/0208 (2013.01); G01J 3/027 (2013.01)

(58) Field of Classification Search
USPC ................. 382/286, 209, 218, 219, 255, 294; 348/135, 345, 160, 208.99; 356/600, 356/601, 602; 324/301; 353/101; 702/157
See application file for complete search history.

(56) References Cited

U.S. PATENT DOCUMENTS

| 6,024,018 A | 2/2000 | Darel et al. |
| 7,890,292 B2 * | 2/2011 | Jacquot .......................... 702/157 |

(Continued)

FOREIGN PATENT DOCUMENTS

| CN | 1784308 A | 6/2006 |
| CN | 101228780 A | 7/2008 |

(Continued)

OTHER PUBLICATIONS

Translation of Sep. 11, 2012 Written Opinion issued in International Patent Application No. PCT/JP2012/064700.

(Continued)

*Primary Examiner* — Anh Do
(74) *Attorney, Agent, or Firm* — Oliff PLC

(57) ABSTRACT

A measurement system is capable of accurately aligning the corresponding measurement points of a plurality of measurement targets to evaluate the measurement targets from measurement results. A measurement system includes a measuring instrument and a PC, the measuring instrument includes a spectroscopic unit that measures a measurement point of a measurement target and a camera that images surroundings in real-time. The PC displays an evaluation image of continuous image information, which is imaged and displayed by the camera on a display screen so as to be superimposed on a reference image of still image information, which has been imaged and stored in memory. By comparing the data obtained by measuring the measurement point in the evaluation image when both images overlap each other and the measurement data of the point in the reference image, it is possible to perform positioning easily and compare the measurement data.

20 Claims, 18 Drawing Sheets

(56) References Cited

U.S. PATENT DOCUMENTS

| | | | |
|---|---|---|---|
| 7,978,254 B2* | 7/2011 | Katsumata | 348/345 |
| 8,705,846 B2* | 4/2014 | Ishigami et al. | 382/154 |
| 8,717,578 B2* | 5/2014 | Ohnishi et al. | 356/602 |
| 8,884,617 B2* | 11/2014 | Goodwill et al. | 324/301 |
| 2006/0230358 A1 | 10/2006 | Sacher et al. | |
| 2007/0019216 A1 | 1/2007 | Chodagiri et al. | |

FOREIGN PATENT DOCUMENTS

| | | |
|---|---|---|
| CN | 101346233 A | 1/2009 |
| EP | 1 958 773 A2 | 8/2008 |
| EP | 2 301 421 A1 | 3/2011 |
| JP | A-11-128176 | 5/1999 |
| JP | A-2002-267600 | 9/2002 |
| JP | A-2003-232683 | 8/2003 |
| JP | A-2004-305377 | 11/2004 |
| JP | A-2005-013597 | 1/2005 |
| JP | A-2009-162571 | 7/2009 |
| WO | 2007/077592 A1 | 7/2007 |

OTHER PUBLICATIONS

Sep. 11, 2012 International Search Report issued in International Application No. PCT/JP2012/064700.

* cited by examiner (a)  (b)

MEASURING INSTRUMENT, MEASUREMENT SYSTEM, MEASUREMENT POSITION POSITIONING METHOD AND MEASUREMENT POSITION POSITIONING PROGRAM USING THE SAME

TECHNICAL FIELD

The present invention relates to a measuring instrument and a measurement system for measuring a physical quantity of a particular point or area, and a measurement position positioning method and a measurement position positioning program using the same. In particular, the present invention relates to a measuring instrument and a measurement system requiring positioning of the corresponding measurement points of two or more measurement targets, and a measurement position positioning method and a measurement program using the same.

BACKGROUND ART

Conventionally, there are various cases where a plurality of measurement targets is accurately aligned in positions in order to evaluate both of the measurement result. The plurality of measurement targets are, for example, a measurement point of a reference measurement target and a measurement point of a measurement target.

For example, in color matching of printed materials by offset printing, in the printing industry, when management of color quality of printed materials in offset printing is performed, measuring of colors of a color chart called a control strip is performed when the colors of a final contract proof (final proof) which is proofed with the customer's approval and a printed material printed by a printing press are matched.

In this color measurement, a spectrophotometer (for example, see Patent Literatures 1 and 2) is generally used. Here, the control strip includes, for example, approximately 200 small measurement patches according to the print size which are called color patches and are generally approximately 5 to 6 mm in square and arranged in a line. The control strip is printed in a white blank of a sheet outside a printing surface of a printed material so as to extend long on the entire width (effective printing range) of a printing press.

Moreover, the color patch is arranged so that the solid patches having density of 100% for each ink colors (cyan, magenta, yellow, and black) are repeatedly arranged in each units of ink fountain key to control a print color. These color patches are used for checking whether an image is printed in appropriate density and $L^*a^*b^*$ values or for checking the uniformity of color on the entire surface of a printed material by measuring the respective density values and the $L^*a^*b^*$ values.

However, ink is transferred from an inking roller to a plate cylinder by the physical pressure of the inking roller of the printing press and a chemical action (repulsion of water and oil), and then, is sequentially transferred from a blanket cylinder (a transfer surface made from rubber) to a print sheet (close to an impression cylinder). Thus, practically, the transfer of ink on the entire surface of the print sheet is not always constant. Thus, it is not possible to accurately check the color reproduction in a picture (image) of the printed material using the color patches only.

Thus, various attempts have been made to directly measure the color of a picture (image) in addition to measuring the colors of the color patches. However, there is a problem that it is difficult to realize positioning for measuring the same points of a final proof and a printed material. For example, a spectrophotometer disclosed in Patent Literatures 1 and 2 facilitates positioning of measurement points by capturing the images of the measurement points. However, a technique for aligning the same measurement points of different measuring targets such as the final proof and the printed material has not been developed.

Positioning may be realized using an X and Y position control device. However, in this case, the system may become expensive, and an accuracy error will be occurred by expansion and shrinking of paper due to humidity and the like, or caused by the accuracy of an output recorder. As a result, the size of a final proof and a printed material may be different or a partial dimensional error may occur. Moreover, it is necessary to develop software that can assemble setting conditions corresponding to various individual conditions. This is because page imposition of double-page spread used for print proof and page imposition layout for a book print (pagination) are completely different in page printings. Thus, it is only possible to realize rough positioning with a simple method and it is difficult to obtain stable measurement results. Furthermore, since the measurement value is different depending on the direction of a picture with respect to a measuring instrument, it is difficult to obtain sufficient measurement accuracy with only the X and Y position control device.

CITATION LIST

Patent Literatures

Patent Literature 1: JP 2003-232683 A
Patent Literature 2: JP 2002-267600 A

SUMMARY OF INVENTION

Technical Problem

As described above, in the conventional art, a system which is easy to handle and which is capable of accurately align the corresponding measurement points of a plurality of measurement targets and evaluating the measurement target from the measurement results at both measurement points in a simple manner is not present.

In order to solve the above problems, an object of the present invention is to provide a measuring instrument and a measurement system which are easy to handle and which are capable of accurately align the corresponding measurement points of a plurality of measurement targets and evaluating the measurement target from the measurement results at both measurement points in a simple manner, and to provide a measurement position alignment method and a measurement position alignment program using the same.

Solution for the Problem

In order to solve the problem and attain the object, a measuring instrument according to the present invention is a measuring instrument that is connectable to a computer, including: a measuring instrument body including a measuring and detecting unit that detects a physical quantity at any measurement point of a measurement target; an imaging unit attached to the measuring instrument body integrally or by fixing means so as to image at least surroundings of the measurement point in the measurement point of the measurement target and the surroundings of the measurement point to obtain continuous image information and output the continuous image information; and an interface unit that outputs the physical quantity detected by the measuring and detecting unit or the measurement value obtained from the physical quantity to the computer together with the continuous image information.

Moreover, a measurement system according to the present invention includes: a measuring instrument that detects a physical quantity at any measuring point of a measurement target and images at least surroundings of the measurement point in the measurement point of the measurement target and the surroundings of the measurement point in real-time to obtain continuous image information and outputs the continuous image information; a storage unit that inputs the continuous image information output from the measuring instrument and stores the continuous image information as still image information together with measurement values based on the physical quantity detected by the measuring instrument; an image processing unit for displaying the continuous image information output from the measuring instrument and the still image information stored in the storage unit in a image matching manner; and a display unit that displays the continuous image information and the still image information superimposed by the image processing unit.

In one embodiment of the present invention, the measuring instrument includes a measuring and detecting unit that detects the physical quantity at any measuring point of the measurement target, and an imaging unit that images at least the surroundings of the measurement point in the measurement point of the measurement target and the surroundings of the measurement point in real-time to obtain the continuous image information and outputs the continuous image information.

In another embodiment of the present invention, the measuring instrument includes an imaging unit that images at least the surroundings of the measurement point in the measurement point of the measurement target and the surroundings of the measurement point in real-time to obtain the continuous image information and outputs the continuous image information, and a measuring and detecting unit that detects the physical quantity at the measurement point from the continuous image information obtained by the imaging unit.

In still another embodiment of the present invention, the measuring instrument includes a measurement value calculating unit that calculates the measurement values from the detected physical quantity, and the measurement system includes an evaluating unit that evaluates the measurement target using the measurement values stored in the storage unit and the measurement values calculated by the measurement value calculating unit based on the detected physical quantity of the measurement point when the continuous image information and the still image information are displayed in the superimposed manner.

In still another embodiment of the present invention, the display unit displays entire image information of the measurement target and information indicating the measurement point in the entire image information, and the measurement system memorizes the measurement values at the measurement point and the information indicating the measurement point related with the still image information.

In still another embodiment of the present invention, the image processing unit displays guide positioning information so as to be superimposed on the continuous image information and the still image information.

In still another embodiment of the present invention, the image processing unit displays the continuous image information and the still image information in different colors and displays a matched portion thereof in another color.

A measurement position alignment method according to the present invention using the measurement system includes: employing the measuring instrument to measure a first measurement point of a first measurement target to obtain a first measurement value; employing the measuring instrument to image and input at least surroundings of the first measurement point in the first measurement point and the surroundings of the first measurement point in real-time and store the same in the storage unit as the still image information together with the first measurement value; employing the measuring instrument to image at least surroundings of a second measurement point in the second measurement point of a second measurement target and the surroundings of the second measurement point and acquire the same as the continuous image information; employing the image processing unit to superimpose the continuous image information on the still image information in real-time and display the same on the display unit; and employing the measuring instrument to measure the second measurement point of the second measurement target to obtain a second measurement value.

In one embodiment of the present invention, the method further includes generating a database in which a plurality of first measurement values and a plurality of items of still image information are correlated for the first measurement target and storing the database in the storage unit, wherein superimposing the continuous image information on the still image information and displaying the same on the display unit involves reading the first measurement value and the still image information corresponding to the second measurement point of the second measurement target from the database and superimposing the still image information on the continuous image information.

Moreover, a measurement position positioning program according to the present invention causes a computer to execute using the measurement system: inputting a first measurement value obtained by the measuring instrument measuring a first measurement point of a first measurement target; inputting the continuous image information obtained by the measuring instrument imaging at least surroundings of the first measurement point in the first measurement point and the surroundings of the first measurement point and storing the continuous image information in the storage unit as the still image information together with the first measurement value; inputting the continuous image information obtained by the measuring instrument imaging at least surroundings of a second measurement point in a second measurement point of a second measurement target and the surroundings of the second measurement point; employing the image processing unit to superimpose the continuous image information on the still image information in real-time and display the same on the display unit; and employing the measuring instrument to measure the second measurement point of the second measurement target to obtain a second measurement value.

In one embodiment of the present invention, the measuring and detecting unit detects physical quantities in a predetermined range of the measurement point from the continuous image information obtained by the imaging unit.

Another measurement system according to the present invention includes: a measuring instrument that detects a physical quantity at any measuring point of a measurement target and images at least surroundings of the measurement point in the measurement point of the measurement target and the surroundings of the measurement point in real-time to obtain continuous image information and outputs the continuous image information; a storage unit that stores still image information together with a physical quantity to be measured; an image processing unit for displaying the continuous image information output from the measuring instrument and the still image information stored in the storage unit in a superimposed manner; and a display unit that displays the continuous image information and the still image information superimposed by the image processing unit.

In one embodiment of the present invention, the measurement system includes a determining unit that judges whether a difference value between the measurement value calculated by the measurement value calculating unit and the measurement value stored in the storage unit satisfies predetermined determination criteria based on the result of evaluation of the evaluating unit.

In another embodiment of the present invention, the determining unit determines whether an estimation value obtained by converting the difference value based on a predetermined color conversion table satisfies the determination criteria, and the display unit displays information indicating the determination results from the determining unit.

In still another embodiment of the present invention, the evaluating unit evaluates the measurement target using a measurement value that is calculated by the measurement value calculating unit every predetermined period or continuously and the measurement value stored in the storage unit based on a variation over time in the physical quantity.

In still another embodiment of the present invention, the measuring instrument includes a correcting unit that corrects device-unique parameters that affect measurements.

Still another measurement system of the present invention includes a first information processing device and a second information processing device connected via a network, the first information processing device including: a storage unit that stores still image information together with a physical quantity; and a transmitting unit that transmits the still image information and the physical quantity stored in the storage unit to the second information processing device via the network, and the second information processing device including: a measuring instrument that detects a physical quantity at any measuring point of a measurement target and images at least surroundings of the measurement point in the measurement point of the measurement target and the surroundings of the measurement point in real-time to obtain continuous image information and outputs the continuous image information;

a receiving unit that receives the still image information and the physical quantity transmitted from the first information processing device; an image processing unit for displaying the continuous image information output from the measuring instrument and the still image information received by the receiving unit in a superimposed manner; and a display unit that displays the continuous image information and the still image information superimposed by the image processing unit.

In one embodiment of the present invention, the second information processing device includes an evaluating unit that evaluates the measurement target based on the physical quantity transmitted from the first information processing device and the physical quantity detected by the measuring instrument when the continuous image information and the still image information are superimposed by the image processing unit.

In another embodiment of the present invention, the first information processing device stores a target physical quantity required as a physical quantity of the measurement target, the second information processing device transmits a physical quantity obtained by measuring the measurement target with the aid of the measuring instrument and parameters that affect the physical quantity to the first information processing device as profile data, and the first information processing device corrects the physical quantity that is transmitted from the first information processing device based on the profile data so that the obtained physical quantity measured by the measuring instrument approaches the target physical quantity and transmits the corrected physical quantity to the second information processing device.

Advantageous Effects of Invention

According to the present invention, it is possible to accurately align the corresponding measurement points of a plurality of measurement targets and evaluate the measurement target from measurement results at both measurement points.

DESCRIPTION OF EMBODIMENTS

Hereinafter, a measuring instrument, a measurement system, a measurement position positioning method, and a measurement position positioning program according to embodiments of the present invention will be described in detail with reference to the accompanying drawings.

[First Embodiment]

A first embodiment is an example in which the present invention is applied to an optical measurement system used when performing color-matching between a final proof and a printed material in offset printing or the like. In this example, the measurement target is a "final proof" and a "printed material," and the former is referred to as a "reference medium" and the latter is referred to as "evaluation medium."

Figure 1:
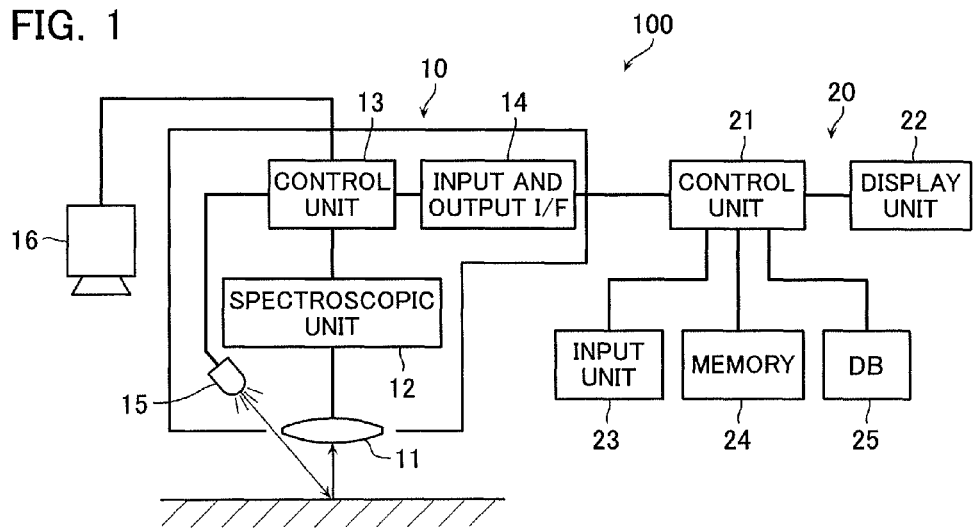
FIG. 1 is a diagram illustrating an entire configuration of a measurement system according to a first embodiment of the present invention.
Figure 2:
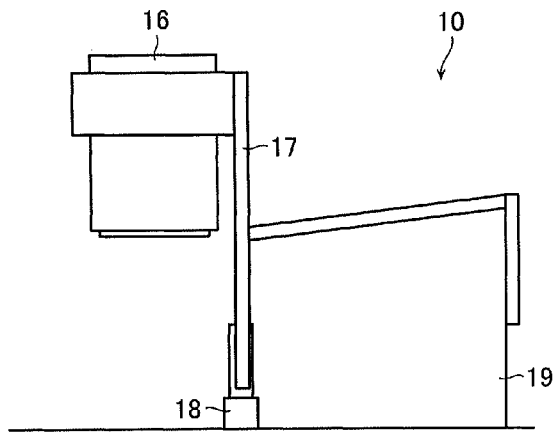
FIG. 2 is a side view of a measuring instrument of the measurement system.
Figure 3:
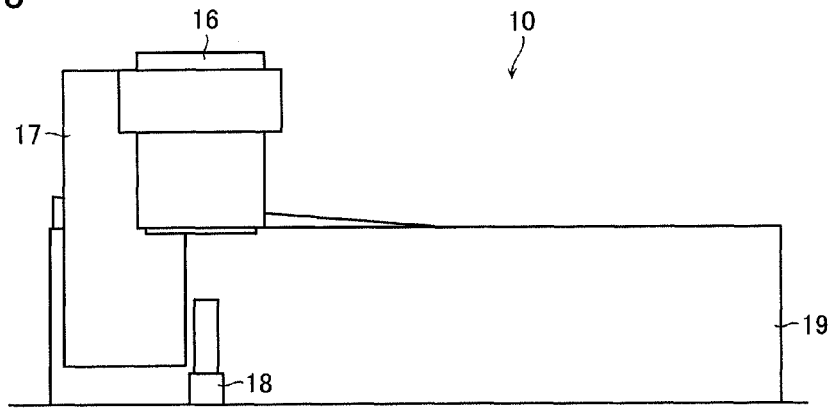
FIG. 3 is a front view of the measuring instrument of the measurement system.
Figure 4:
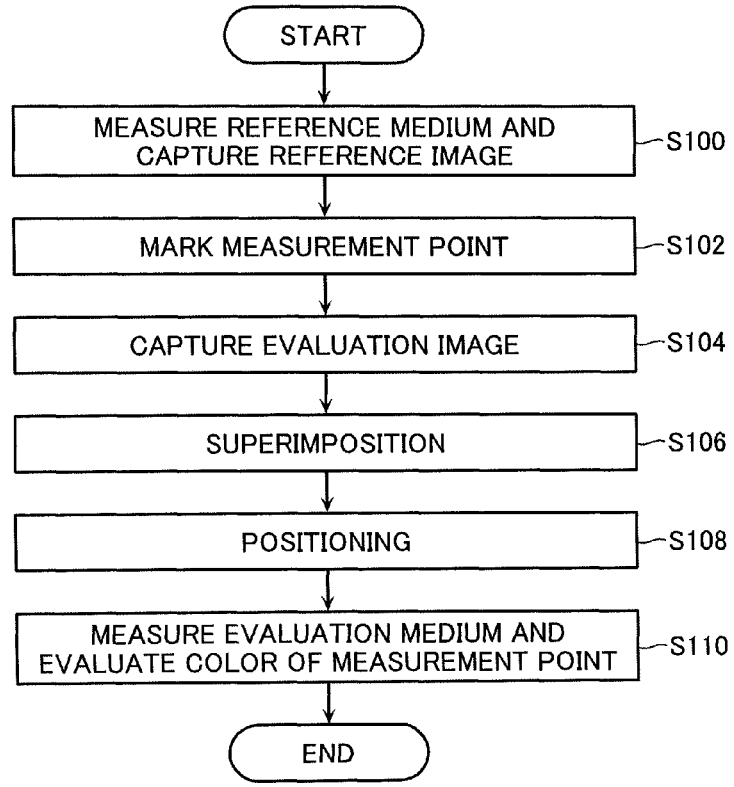
FIG. 4 is a flowchart illustrating the flow of a measurement process of the measurement system.

FIG. 1 is a diagram illustrating an entire configuration of a measurement system according to the first embodiment of the present invention. FIG. 2 is a side view of a measuring instrument of the measurement system and FIG. 3 is a front view. FIG. 4 is a flowchart illustrating the flow of a measurement process of the measurement system.

As illustrated in FIG. 1, a measurement system 100 is configured to include a measuring instrument 10 and a computer (PC) 20. The measuring instrument 10 includes a lens unit 11, a spectroscopic unit 12, a control unit 13, an input and output interface (I/F) 14, a light source 15, and a camera 16. The PC 20 includes a control unit 21 that performs image processing according to a correlation operation or the like, a display unit 22, an input unit 23, a memory 24, and a database (DB) 25.

The measuring instrument 10 of this example has the function of an existing spectrophotometer, for example. That is, light emitted from the light source 15 to a measurement point of a medium is input to the spectroscopic unit 12 via the lens unit 11, and the spectroscopic unit 12 measures the color of the measurement point. Measurement data that is calculated by the control unit 13 based on light dispersed by the spectroscopic unit 12 is transmitted to the control unit 21 of the PC 20 via the input and output I/F 14 and is stored in the memory 24 together with additional information such as identification information indicating a measurement order or marking position information described later.

As illustrated in FIGS. 2 and 3, the measurement point of the medium is captured by a measurement aperture 18 provided in the measuring instrument body 19. The images of the surroundings of the measurement point or the surroundings including the measurement point are captured in real-time by the camera 16 attached to the measuring instrument body 19 with the aid of a fixing device 17.

Moreover, continuous image information indicating the continuous images captured in real-time is transmitted to the control unit 21 of the PC 20 via the control unit 13 and the input and output I/F 14, stored in the memory 24, and displayed on the display screen of the display unit 22. The continuous image information is a video signal obtained by capturing in real-time.

Moreover, the continuous image information includes still image information that is captured continuously as well as video information. The measurement data and the continuous image information are stored in correlation in the database (DB) 25 built in a storage device such as an HDD (not illustrated) included in the PC 20.

In the measurement system 100 having such a configuration, the measurement points of the images are aligned using an image (or a neighboring image including the measurement point; hereinafter this image will be referred to as a "reference image") of the surroundings of the measurement point of a reference medium such as a final proof having an image formed thereon and an image (hereinafter referred to as an "evaluation image") of the surroundings of the measurement point of an evaluation medium such as a printed material having substantially the same image as the reference medium formed thereon. Specifically, such processes as illustrated in FIG. 4 are performed.

First, the measuring instrument 10 is set so that the measurement aperture 18 is positioned at any measuring point of the reference medium. The measuring instrument 10 measures the color of the measurement point to acquire measurement data including color information and the camera 16 captures the reference image of the surroundings of the measurement point at the point in time at which the measurement data is measured to acquire the reference image as still image information (step S100).

Preferably, the camera 16 captures the reference image at the same time as the point in time at which the measurement data is measured or acquired so that a positional shift does not occur between the reference image and the measurement point. Moreover, the measurement data acquired by the measuring instrument 10 and the still image information of the reference image are transmitted to the PC 20 and are processed by the control unit 21 and stored in the database 25. The still image information is stored in the memory 24. When the measurement data is measured at a plurality of measurement points, the measurement data and the still image information are correlated with each other for each measurement point and stored in the memory 24 and the database 25.

The reference image of the surroundings of the measurement point is obtained by imaging a partial area of the final proof which is a reference medium. Thus, in order to display the position of the reference image in an entire image, the image information of the entire image is inputted to the PC 20 as digital data of formats such as print production format (PPF) or raster image processor (RIP) from prepress systems. Alternatively, the image information of the entire system may be inputted from a camera, a scanner, or various image sensors. This inputting may be performed prior to step S100.

Subsequently, the PC 20 marks the measurement point in the entire image of the reference medium on the inputted entire image (step S102).

Figure 5:
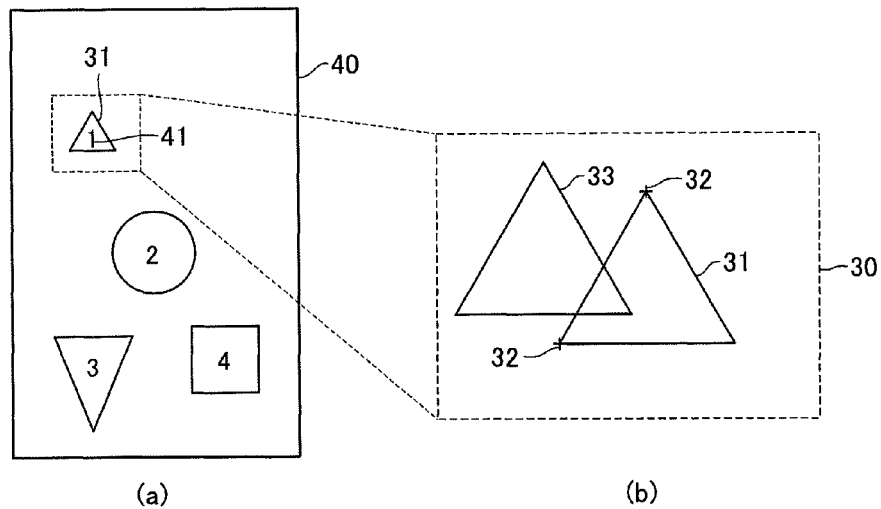
FIGS. 5(a) and 5(b) are diagrams illustrating an example of a display screen of the measurement system.

The marking is realized by putting a mark "+" or a marking number such as "1," "2," "3," or the like on the measurement point, for example, so that the measurement point can be perceived on the display screen of the display unit 22. The marking number indicates a measurement order, for example. FIG. 5(*a*) illustrates an example in which a marking number 41 is added to an entire image 40. The marking position and the marking number may be manually assigned or may be automatically assigned using a device such as a digitizer that detects X and Y positions. The marking position may indicate a rough measurement point in the entire image, and the measurement point and the marking position are not necessarily accurately aligned. Moreover, the marking position may be assigned so that an ink key number of an ink fountain corresponding to the marking position can be determined in order to adjust the amount of ink in a printing press.

Subsequently, the measuring instrument 10 is set so that the measurement aperture 18 is positioned at any measuring point of the evaluation medium, and the camera 16 captures the evaluation image of the surroundings of the measurement point in real-time (step S104). Thus, the evaluation image is acquired in a live manner. The control unit 21 of the PC 20 displays the continuous image information of the evaluation image acquired in this manner and the still image information of the reference image stored in the memory 24 on the display screen of the display unit 22 in a superimposed manner (step S106).

Specifically, as illustrated in FIG. 5(*b*), the reference image 31 which is the still image information stored in the memory 24 is displayed on the display screen 30, and the evaluation image 33 which is the continuous image information captured in real-time by the camera 16 is displayed on the display screen 30. By moving the position of the measuring instrument 10 using these images 31 and 33 so that both displayed images 31 and 33 superimpose on each other, it is possible to perform positioning (step S108). A reference mark such as a line mark or a concavo-convex mark for indicating measurement points and assisting positional control may be formed in a portion of the measuring instrument 10 as a reference point of positioning so that the reference mark is included in the evaluation image 33 of the surroundings of the measurement point. By doing so, positioning is made easier.

In this case, a mark 32 serving as the reference point of positioning may be added manually or may be added automatically by a feature point extracting process. Moreover, when both images 31 and 33 are displayed in different colors, it is possible to easily perceive the superimposed state. Moreover, the superimposed state may be displayed by displaying the image matching rate (%) of both images 31 and 33 or by changing the color of the frame of the display screen 30 according to the degree of image matching.

Figure 6:
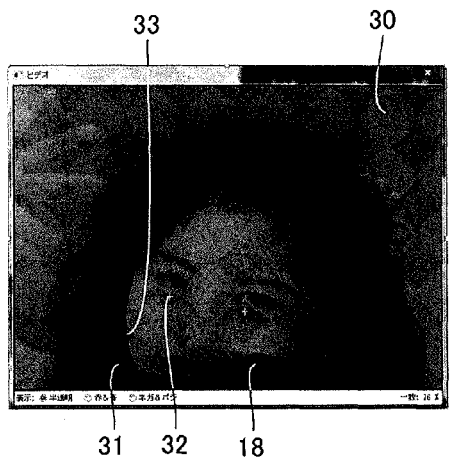
FIG. 6 is a diagram illustrating an example of display screen of the measurement system.
Figure 7:
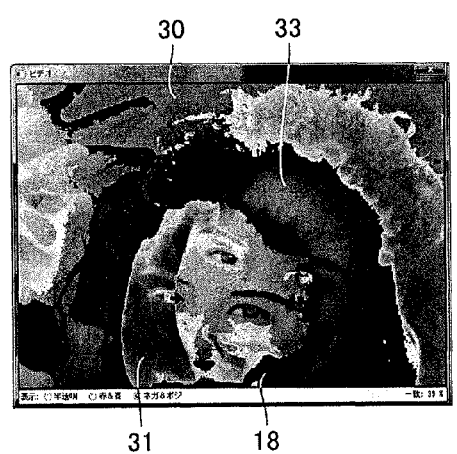
FIG. 7 is a diagram illustrating an example of a display screen of the measurement system.

For example, when an image superimposition process is performed in such a manner that the reference image 31 is displayed semi-transparently and superimposed on the evaluation image 33, the display screen 30 in which both images 31 and 33 are not identically superimposed is as illustrated in FIG. 6. In FIG. 6, the "+" mark 32 for facilitating positioning is displayed. Moreover, when the reference image 31 is displayed in a negative version and superimposed on the evaluation image 33 displayed in a positive version, the display screen 30 in which both images are not identically matched is as illustrated in FIG. 7.

Figure 8:
FIGS. 8(a) and 8(b) are diagrams illustrating an example of a display screen of the measurement system.

Further, when any one of these images 31 and 33 is displayed in a blue color and the other in a red color and both images are superimposed on each other, if the superimposed images are not matched, red or blue portions occupy a larger portion of the display screen 30 as illustrated in FIG. 8(*a*). If the superimposed images are substantially identical, gray portions occupy a larger portion of the display screen 30 as illustrated in FIG. 8(*b*). By devising a display mode of both images 31 and 33 on the display screen 30, it is possible to easily perceive the image matching.

In the measurement system 100 according to the present embodiment, the measurement points captured by the measurement aperture 18 can be aligned while checking the superimposition of images with naked eyes in this manner. Thus, it is possible to accurately align the measurement point on the reference medium and the measurement point on the evaluation medium up to an error range of one pixel level with a very inexpensive configuration and a simple operation.

When both images 31 and 33 are aligned in this manner and both images are substantially identical, the measuring instrument 10 measures the colors of the measurement points of the evaluation medium to acquire measurement data, and the control unit 21 of the PC 20 evaluates the colors of the measurement points (step S110). The colors of the measurement point are evaluated, for example, by comparing the colors of the measurement points based on the L*a*b* values or density values output from the measuring instrument 10 or the Munsell's color values or by evaluating a color difference based on ΔE or CIEDE2000.

The images used for positioning may also be used for color measurement, color difference evaluation or the like. Alternatively, the images may be used for positioning and may be switchably used for color measurement, color difference evaluation or the like. When the images used for positioning are used for color measurement, color difference evaluation or the like, the images are superimposed using pixel units or pixel groups (groups for comparison of average values, in which a plurality of pixels is assembled into one block, in order to prevent the measurement value for comparison from becoming unstable due to particles or small patterns of the image) of images of the camera 16 or the like as the smallest units to perform an image color difference calculation process.

Specifically, the camera 16 may be used as a measuring instrument that uses an RGB filter, a CIEXYZ filter, a CIEXYZ equivalent filter, or the like while allowing the camera 16 to capture the evaluation image of the surroundings of the measurement point in real-time. For example, when a color filter is used, colors can be expressed using a CIELAB color system, the Munsell's color system, or the like. Alternatively, the camera 16 may be used as a measuring instrument that uses an infrared or ultraviolet camera, a laser image input device, or the like.

A CIEXYZ equivalent filter is a filter satisfying such conditions that spectral characteristics (s1, s2, s3) satisfying the CIE-XYZ spectral characteristics have mountain shapes each having no negative value and having a single peak, the peak values of the spectral curves are equal, and the overlapping portions of the skirt positions of the spectral curves are as small as possible while the peak values of the spectral curves are equal.

An image position superimposition process and an image color difference calculation process are successively performed using the reference image 31 and the evaluation image 33 acquired by the camera 16. The image color difference calculation process involves obtaining a color difference based on any one of the color systems between the reference image 31 and the evaluation image 33 in units of one pixel or a pixel group and calculating an average color difference (an average value obtained by adding the color differences between respective pixels or pixel groups of a small area) in a color evaluation range. The color difference may be obtained in units of a pixel group rather than in units of one pixel strictly.

Figure 9:
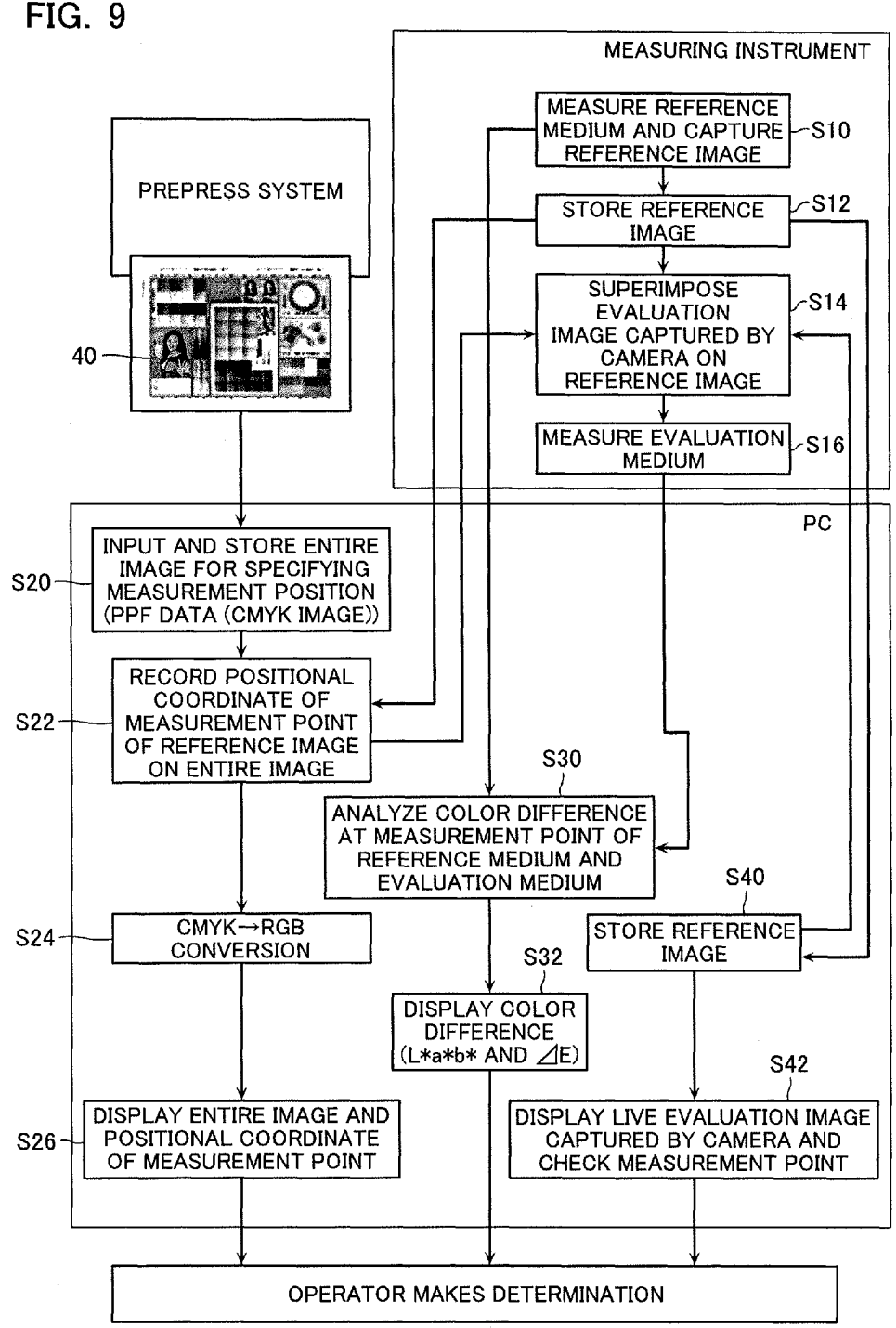
FIG. 9 is a diagram illustrating details of the flow of the process of the measurement system.

Next, details of the flow of processes of the measurement system 100 will be described. As illustrated in FIG. 9, the entire image (CIP4-PPF data (CMYK image)) 40 for specifying the measurement point, sent from the prepress system is input by the input unit 23 of the PC 20 and is stored in the memory 24 (step S20). Here, the PPF data is job data that includes image information indicating the entire surface of a picture (image) of a printed material sent from the prepress system that creates an original edition for printing.

The PPF data is used for setting a basic ink amount of a printing press and includes CMYK image data of a low resolution (approximately 50 dpi). Moreover, the job data may include picture (continuous-tone image or 1-bit image) data obtained through a RIP image file process.

Moreover, the job data may include data indicating a picture (image) that is captured by a digital camera, input from a scanner, or obtained by an image input device that acquires L*a*b* values.

On the other hand, in the measuring instrument 10, the measurement point of the reference medium is measured and the reference image is captured (step S10), and the still image information of the reference image and the measurement data are stored in a memory (not illustrated) or the like (step S12). The stored still image information of the reference image and the like are transmitted to the PC 20. By the control unit 21, the images are stored in the memory 24 (step S40), and a process of recording the positional coordinates of the measurement points of the reference image on the entire image is performed (step S22).

The measuring instrument 10 superimposes the evaluation image of the continuous image information captured by the camera 16 on the reference image using the data stored in the PC 20 side in steps S40 and S22 (step S14), measures the measurement point of the evaluation medium (step S16), and outputs the measurement data to the PC 20.

The control unit 21 of the PC 20 performs CMYK-to-RGB conversion (step S24) on the entire image on which the positional coordinates of the measurement points of the reference image are recorded and displays the entire image and the positional coordinates of the measurement points on the display screen of the display unit 22 (step S26). Moreover, the control unit 21 of the PC 20 performs color difference analysis at the measurement points of the reference medium and the evaluation medium obtained by the measuring instrument 10 in steps S10 and S16 (step S30) and displays a difference for each of L*, a*, and b* or a color difference (ΔE, CIEDE2000, or the like) on the display screen of the display unit 22 (step S32).

Further, the PC 20 displays the continuous image information of the evaluation image captured by the camera 16 using the still image information of the reference image stored in step S40 on the display screen of the display unit 22 in a state of being superimposed on the reference image and performs a process of increasing the accuracy of image superimposition while checking the positions of the measurement points (step S42). The operator can check the measurement points with naked eyes at the end of steps S26, S32, and S42. These steps are not necessarily performed time-sequentially but may be performed simultaneously.

As described above, according to the measurement system 100 of the first embodiment, it is possible to align the same positions of the same images or pictures of a plurality of media (reference media, evaluation media, or the like) in an accurate and simple manner and to accurately measure and compare the same positions.

Although the measuring instrument 10 has been described as having the function of a spectrophotometer, the measuring instrument 10 may have a measuring function of a densitometer, a colorimeter, a luminance meter, or the like. Moreover, although the measuring instrument 10 has a configuration in which the camera 16 is an independent component that is attached to the measuring instrument body 19 with the aid of the fixing device 17, the camera 16 may be integrally attached to the measuring instrument 10. Moreover, the camera 16 may capture images taken from the same light receiving aperture (light receiving system) as the measurement aperture 18.

[Second Embodiment]

Figure 10:
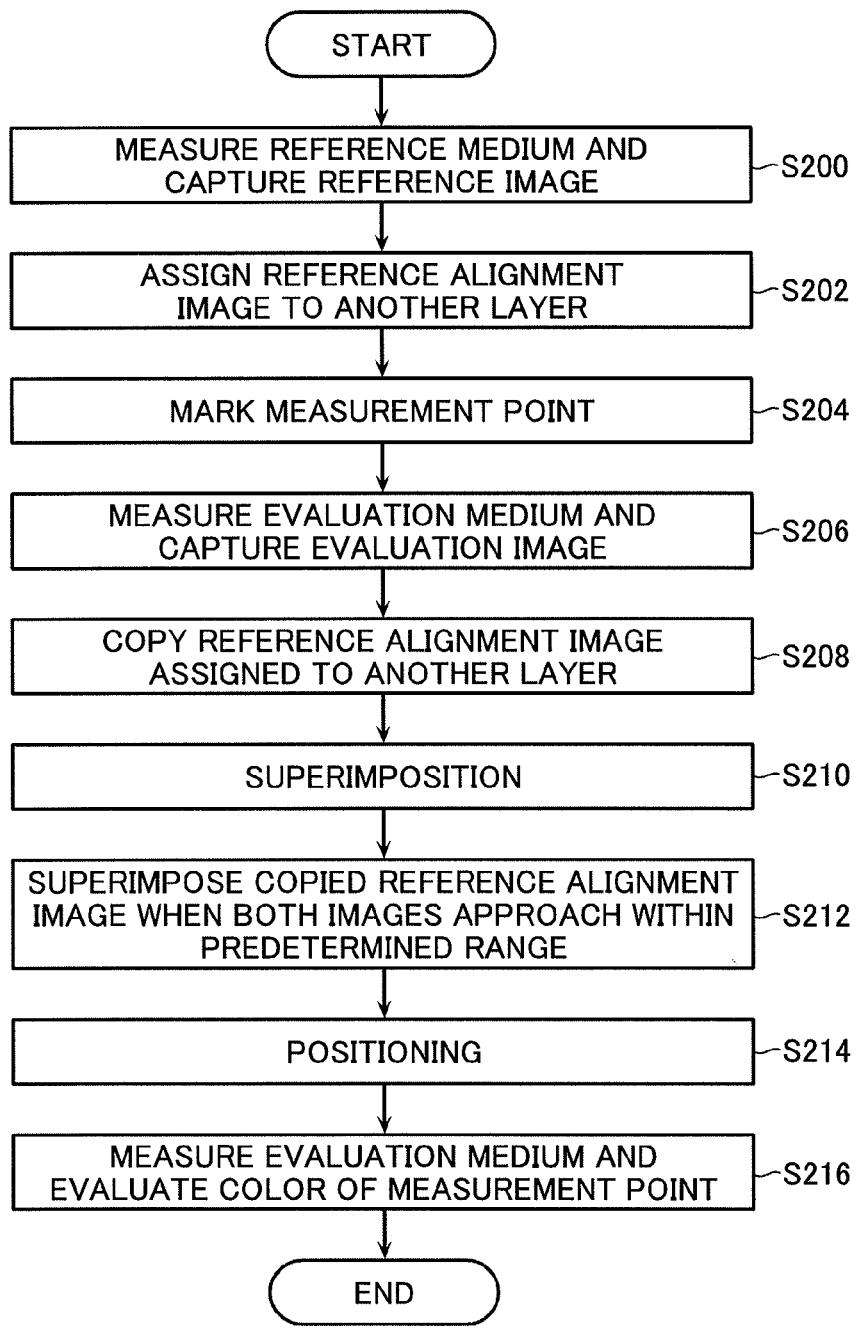
FIG. 10 is a flowchart illustrating the flow of a measurement process of a measurement system according to a second embodiment of the present invention.
Figure 11:
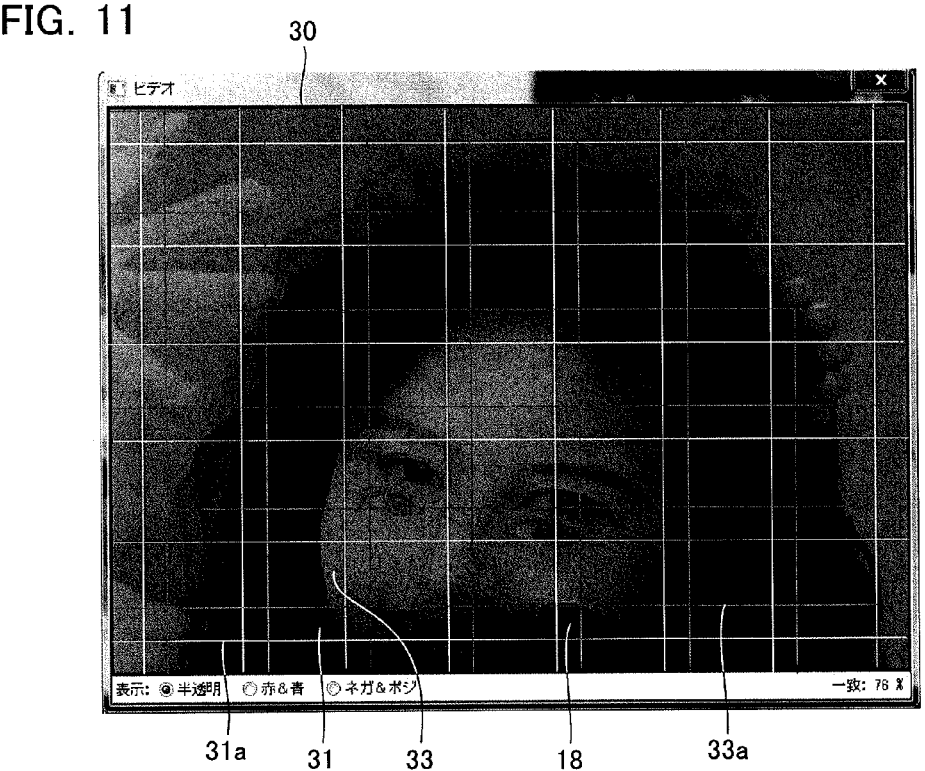
FIG. 11 is a diagram illustrating an example of a display screen of the measurement system.

FIG. 10 is a flowchart illustrating the flow of a measurement process of a measurement system according to a second embodiment of the present invention. FIG. 11 is a diagram illustrating an example of a display screen of the measurement system. The measurement system according to the present embodiment has the same configuration as the measurement system 100 according to the first embodiment. The present embodiment is different from the first embodiment in that a reference positioning image serving as a reference point of positioning is added instead of the mark 32.

As illustrated in FIG. 10, first, the measuring instrument 10 is set so that the measurement aperture 18 is positioned at any measuring point of the reference medium, the color of the measurement point is measured to acquire measurement data including color information or the like, and the camera 16 captures the reference image of the surroundings of the measurement point at the point in time at which the measurement data is measured to acquire the reference image as still image information (step S200).

The PC 20 stores the measurement data and the still image information of the reference image transmitted from the measuring instrument 10 in the memory 24 and the database 25, sets feature points of the reference image on a layer different from the layer on which the reference image is displayed as reference points, and assigns a reference positioning image (step S202). The reference positioning image may be a matrix line, a grid line, a frame, or a cross registration mark, or the like, for example.

In the PC 20, the measurement points of the entire image of the reference medium are marked on the inputted entire image (step S204). Subsequently, the measuring instrument 10 is set so that the measurement aperture 18 is positioned at the measurement point of the evaluation medium indicating the same measurement point as the reference medium, and the evaluation image of the surroundings of the measurement point is continuously captured in real-time (step S206).

The PC 20 acquires the continuous image information of the evaluation image in a live manner and stores the same in the database 25. In this way, the PC 20 copies and records the reference positioning image assigned to the separate layer of the reference image on a layer different from the layer on which the evaluation image is displayed (step S208) and displays the acquired evaluation image, the reference image of the still image information stored in the memory 24, and the reference positioning image assigned in step S202 on the display screen in a superimposed manner (step S210).

The control unit 21 performs a feature point extraction process, a correlation operation, and the like. When it is determined that the reference image and the evaluation image have approached each other to be positioned within a predetermined range, the control unit 21 displays the reference positioning image recorded on the separate layer in step S208 so as to be superimposed on the evaluation image (step S212).

Specifically, as illustrated in FIG. 11, in a state where the reference image 31, a grid line 31a as the reference positioning image, and the evaluation image 33 are displayed on the display screen 30, when both images 31 and 33 have approached each other to be positioned within a predetermined range, the images are displayed in a superimposed manner so that a grid line 33a of the evaluation image 33 follows the movement of the evaluation image 33.

By moving the position of the measuring instrument 10 using the images 31 and 33 and the grid lines 31a and 33a so that both images 31 and 33 and the grid lines 31a and 33a are superimposed, it is possible to perform positioning (step S214). When both are substantially identical, the measuring instrument 10 measures the color of the measurement point of the evaluation medium, and the control unit 21 of the PC 20 evaluates the color of the measurement point in the same manner as above (step S216).

As described above, according to the measurement system of the second embodiment, it is possible to obtain the same advantages as the measurement system 100 according to the first embodiment and to align the images with the aid of the reference positioning image in an easier and more reliable manner.

[Third Embodiment]

Figure 12:
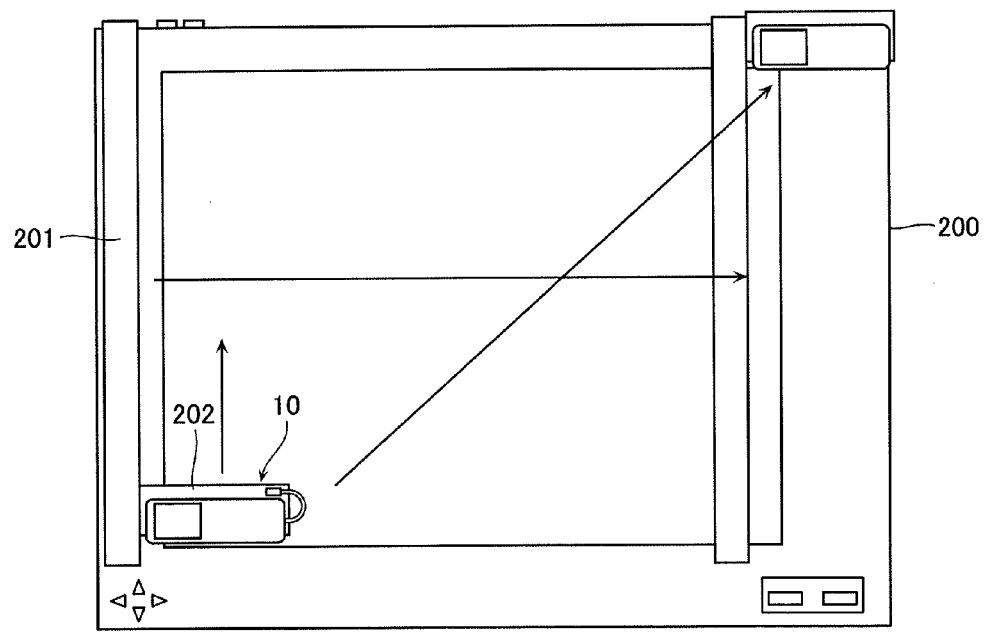
FIG. 12 is a layout diagram of measuring instruments of a measurement system according to a third embodiment of the present invention.

As illustrated in FIG. 12, the measuring instrument 10 according to the present invention may be attached to an existing 2 or 3-dimensional position control device 200, for example, to measure colors. The position control device 200 can control the position of the measuring instrument 10 with the aid of movable shafts 201 and 202 so that the measuring instrument 10 can freely move in X and Y directions, as illustrated with arrows in the figure. By doing so, the present invention can be favorably applied to measurement of colors on a printed surface on which ink is not dried as in an evaluation medium such as a printed material immediately after printing without dirt adhering to the measuring instrument 10.

Moreover, although not illustrated in the drawing, the measurement system may have a configuration in which a measuring instrument is fixed to a predetermined fixing portion and the measurement target is moved by an X and Y-position (automatic) control device. In this case, rough positioning may be realized by the X and Y-position (automatic) control device and the images may be superimposed by manual movement while viewing the continuous image information in a live manner. By doing so, it is possible to effectively deal with a case where the positions are different due to expansion and shrinking of paper or page imposition. In this case, by allowing the position control device 200 to store coordinate values obtained by superimposing an image indicating the reference measurement point and the evaluation medium, it is possible to eliminate the process of superimposing the evaluation medium measured after the second time and to realize an automated continuous measurement process using the coordinate values with a simple configuration of a combination of the measuring instrument 10 and a driving control device.

[Fourth Embodiment]

Figure 13:
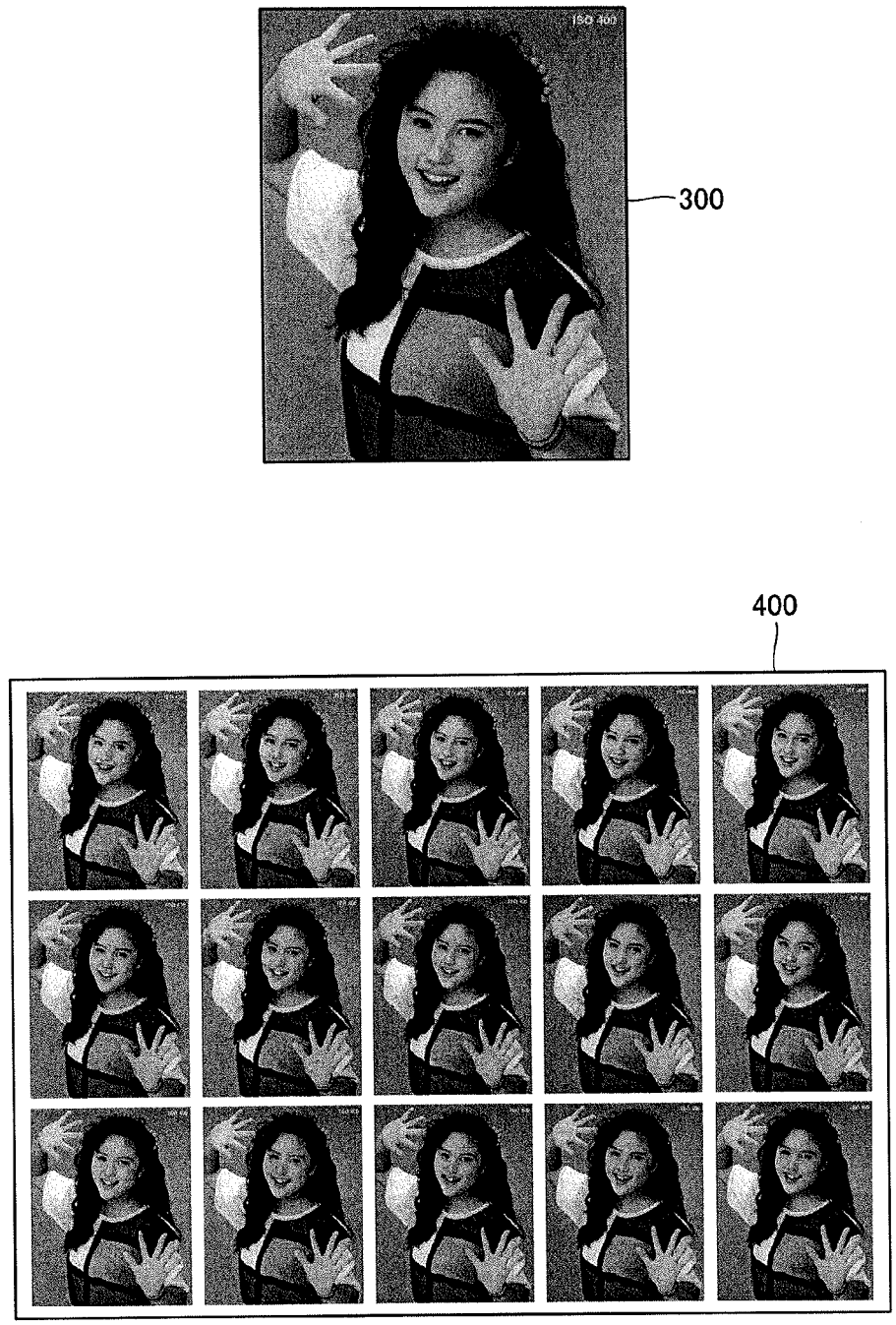
FIG. 13 is a diagram illustrating an example of media of a measurement system according to a fourth embodiment of the present invention.
Figure 14:
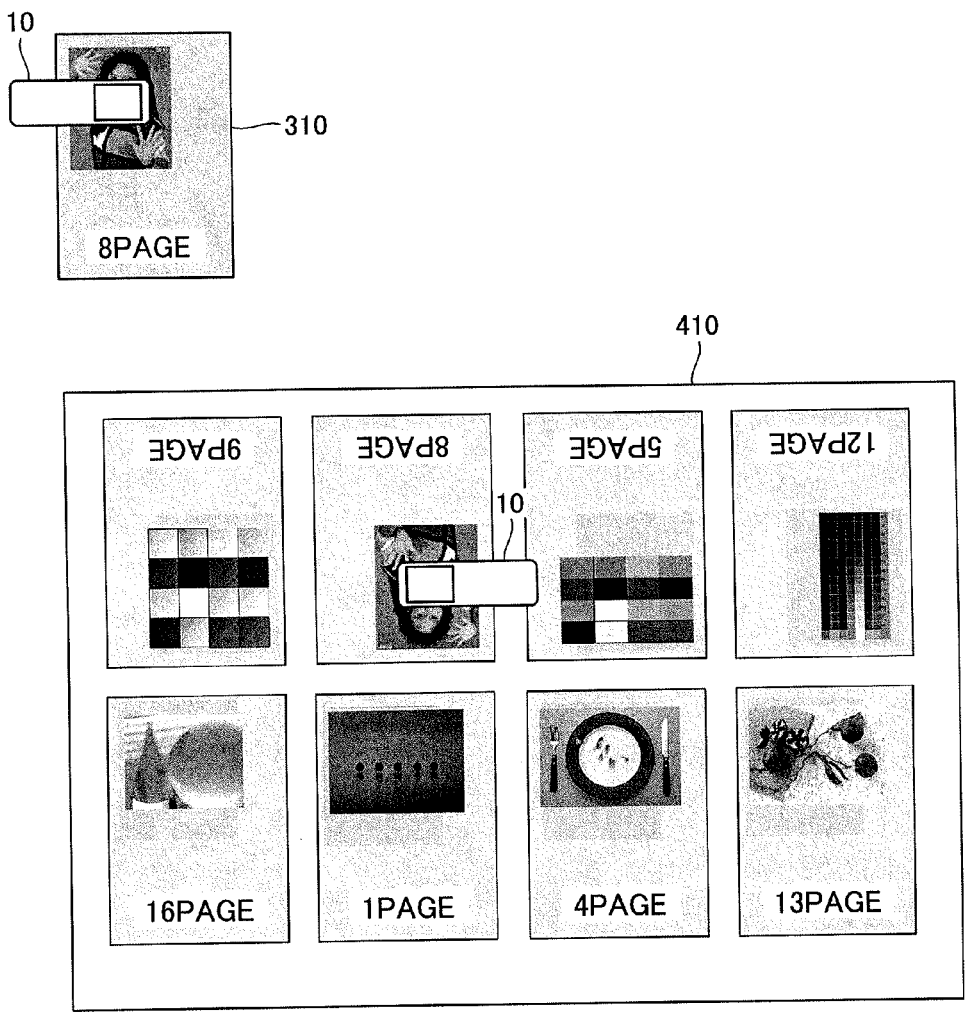
FIG. 14 is a diagram illustrating an example of media of the measurement system.

According to the measurement system of the present invention, even when a reference medium 300 such as a final proof that is single-page printed (on which only one single-page image is printed), for example, and an evaluation medium 400 such as a printed material that is multiple-page printed (on which multiple single-page images are printed) are compared as illustrated in FIG. 13, or a reference medium 310 such as a final proof that is single-page printed, for example, and the corresponding page of an evaluation medium 410 such as a printed material that includes multiple pages are compared as illustrated in FIG. 14, the colors of the reference image and the evaluation image can be measured and compared in an easy and inexpensive manner without assembling a special program that is required in the X and Y-position (automatic) control device such as an existing X and Y plotter. When these two images approach, positioning may be performed manually or may be automatically performed by converting a positional shift width based on the number of pixels and a resolution.

According to the measurement system of the present invention, the image information captured together with the measurement data can be stored in the database 25 in correlation with the measurement target and the measurement point and be used in the PC 20, it is possible to accumulate the measurement data of images and samples of various media and to use the same for measurement and comparison of colors. In this case, additional information such as an image name, the date of capture, an input No., and a thumbnail image may be further added to the database 25 together with the measurement data, the image information, and the measurement point information (marks, coordinates, and the like). In this case, it is possible to read desired measurement data, image information, and measurement point from these items of additional information.

The imaging unit of the present invention may be an image input device that inputs images in a wavelength range longer or shorter than the visible light such as infrared rays, ultraviolet rays, or X-rays, a device that converts the output of various sensors such as a photoelectric sensor, an ultrasound sensor, a thermo-sensor, or a radiation sensor into an image, a device that converts a laser scan signal into an image, and a device that converts reflected sound waves into an image as well as a video camera that uses the existing RGB filter, a CIEXYZ filter, a CIEXYZ equivalent filter, a spectroscopic filter, or the like, and a still camera capable of continuous shooting.

[Fifth Embodiment]

Figure 15:
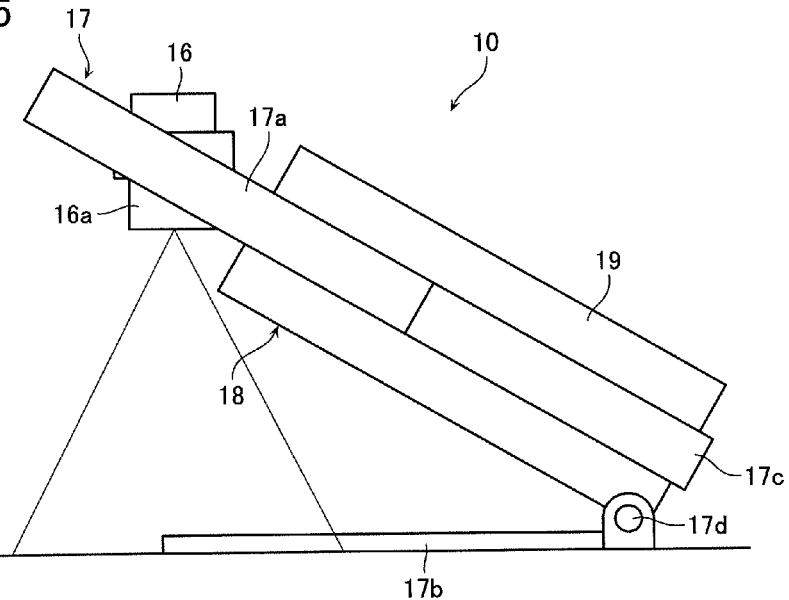
FIG. 15 is a side view of a measuring instrument of a measurement system according to a fifth embodiment of the present invention.
Figure 16:
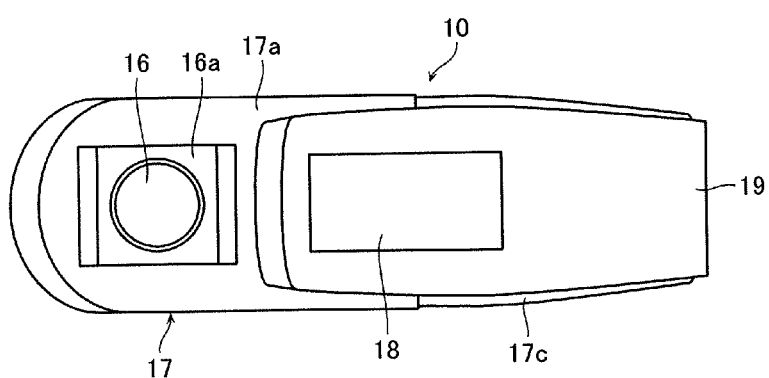
FIG. 16 is a plan view of a measuring instrument of the measurement system.

FIGS. 15 and 16 are diagrams illustrating an example of a configuration of a measuring instrument 10 different from that illustrated in FIGS. 2 and 3.

In the present embodiment, a hinge-type measuring instrument 10 is used. A measuring instrument body 19 (spectrophotometer body) is inserted from one end side into a fixing plate 17a of a fixing device 17 and is fixed to the fixing plate 17a by a rubber band 17c or the like, for example. A support plate 17b is rotatably attached to one end of the measuring instrument body 19 with a rotation shaft 17d interposed. In this manner, a hinge structure in which the fixing plate 17a and the measuring instrument body 19 can be adjusted in an optional angle with respect to the support plate 17b is realized. A camera 16 is rotatably attached to the fixing plate 17a of the fixing device 17 with a camera fixing device 16a interposed. Due to this, the measuring instrument body 19 is set at an optional angle with respect to the support plate 17b, and the camera 16 can image the measurement point measured by the measurement aperture 18 formed in the measuring instrument body 19 and the surroundings thereof. Depending on an actuating structure during measurement of the measuring instrument 10, a weight (not illustrated) for realizing weight balance of the camera 16 may be mounted or an additional spring may be reinforced.

The fixing device 17 has such a structure that the attached camera 16 is not shifted during positioning or measurement. For example, when the camera 16 moves from the attached state, a fixing member such as thin rubber may be inserted between the camera 16 and the fixing plate 17a. Moreover, a supporting portion may be stabilized by reliably surrounding the support plate 17b of the measuring instrument 10 with a flexible elastic material such as thin rubber. Further, when the measuring instrument 10 is transported or subjected to maintenance, the measuring instrument body 19 may be configured to be detached.

[Sixth Embodiment]

Figure 17:
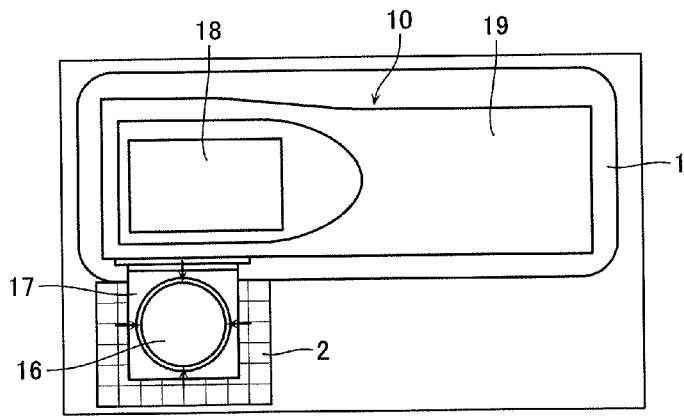
FIG. 17 is a plan view of a measuring instrument of a measurement system according to a sixth embodiment of the present invention.

FIG. 17 is a diagram illustrating an example of a configuration of another measuring instrument 10 different from that illustrated in FIGS. 15 and 16.

In the present embodiment, the measuring instrument 10 includes a position correcting mechanism. The position correcting mechanism is provided for cases when a camera 16 is attached and detached and the attachment position is shifted. The position correcting mechanism performs position correction using a dedicated camera and an adjustment mechanism for aligning a reference position of an image. The camera 16 is attached to a fixing device 17 by a position movement adjustment screw (not illustrated) and is attached and fixed to a measuring instrument body 19 with the aid of the fixing device 17.

When reference position alignment is performed, first, the measuring instrument 10 is placed on a stand 1 that is integrated with a camera position positioning adjustment grid scale 2 . Next, the camera position positioning adjustment grid scale 2 is imaged by the camera 16. Then, adjustment is performed so that the center and dimension of the grid scale 2 in the captured image match the center and dimension of the grid scale 2 in an image captured when the measuring instrument 10 is first placed on the stand 1.

That is, the position movement adjustment screw is adjusted to move the camera 16 while displaying the two images in a superimposed manner so that the images of the grid scale 2 are identical. In this manner, it is possible to correct a positional shift between the image captured by the camera 16 and the image of the reference position.

[Seventh Embodiment]

Figure 18:
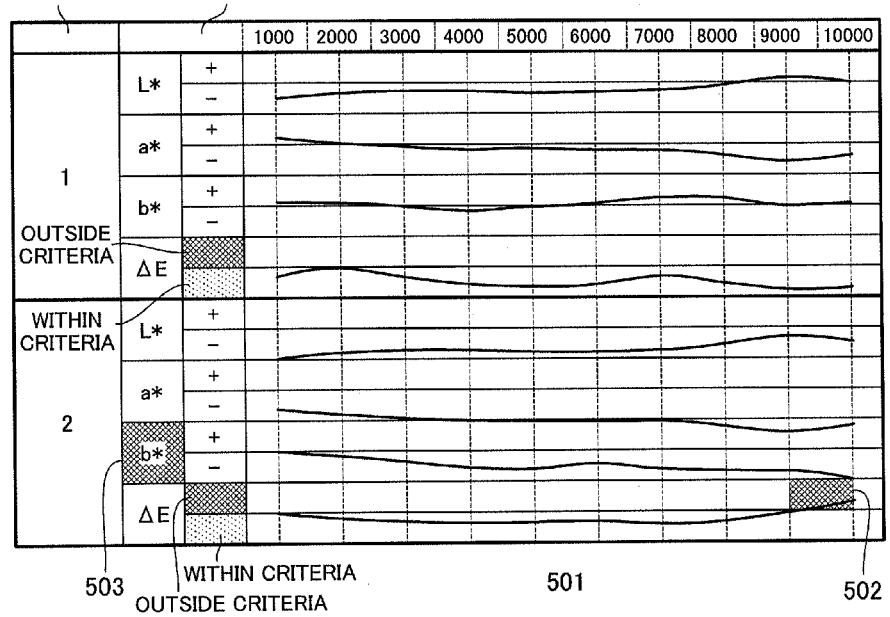
FIG. 18 is a diagram illustrating the results of color evaluation in a measurement system according to a seventh embodiment of the present invention.

FIG. 18 is a diagram illustrating the results of color evaluation in a measurement system according to a seventh embodiment of the present invention. The measurement system according to the present embodiment displays changes over time in the colors of the aligned images at the measurement points of the reference image and the evaluation image during situations such as printing of a printed material in a printing press (not illustrated) or continuous printing to perform color evaluation.

The changes over time are displayed, for example, by aligning the measurement points of an evaluation image of a printed material every sheet or every predetermined interval, performing color measurement successively, and displaying evaluation results such as color difference in a visually perceivable manner. Specifically, in order to check the changes over time in color, the colors of one or multiple measurement points of a predetermined number or all of printed materials are measured for each elapse of time, and at the same time, time-dependent color evaluation graphs that record the changes over time in the color difference or the respective L*, a*, and b* values, or numerical values or the like are displayed on a display screen for monitoring as the changes over time or output.

When the color evaluation results at all measurement points are within the determination criteria of color difference or the like, the average of the measurement values for each measurement item at all measurement points may be automatically printed as a color quality evaluation certificate indicating the changes over time of colors. FIG. 18 illustrates graph lines 501 illustrating the evaluation results of L*, a*, and b* values and ΔE obtained by evaluating the changes over time in colors of the image of the printed material every 1000 sheets with the progress time of printing of the printed material, for example. The measurement coordinate indicates the measurement point, for example.

As illustrated in the drawing, when ΔE is outside the determination criteria in a frame 502 corresponding to approximately 9500 pages of sheet, the background or the line of the graph line 501 of the frame 502 or that of a frame 503 indicating the measurement value that causes this situation may be displayed in a color such as red different from the other. In this manner, the printing operator can be notified of the situation by displaying the fact that a certain evaluation result is outside the determination criteria, outputting an audible warning signal, or inserting and displaying a mark in a printing sheet using a tab inserter. Besides this, the notification may be realized by outputting audio information or lighting predetermined light.

The measurement system according to the present embodiment can be used as a tool for recording the color quality of all printed materials to verify quality. This measurement system may be applied to perform simulations on the changes in color after dry-down or surface processing to be described below so as to perform color evaluation.

[Eighth Embodiment]

Figure 19:
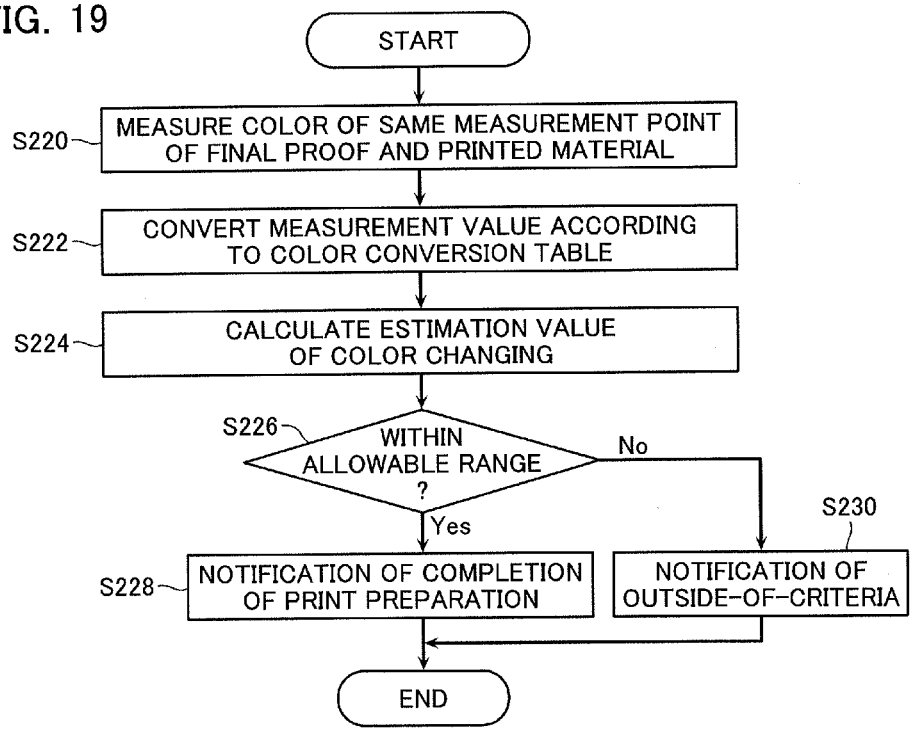
FIG. 19 is a flowchart illustrating the flow of a color evaluation process of a measurement system according to an eighth embodiment of the present invention.
Figure 20:
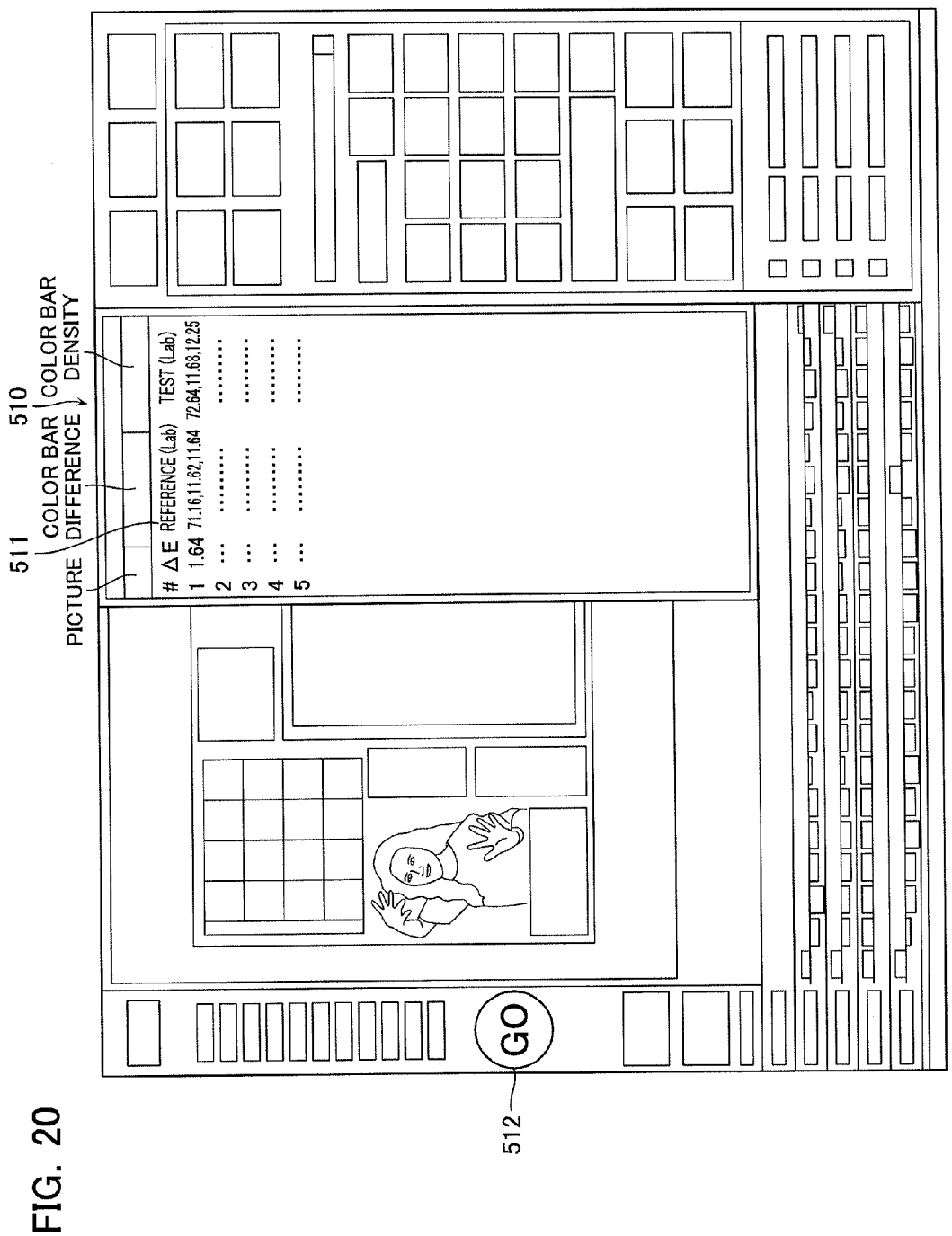
FIG. 20 is a diagram illustrating an example of a display screen of the measurement system.

FIG. 19 is a flowchart illustrating the flow of a color evaluation process of a measurement system according to an eighth embodiment of the present invention, and FIG. 20 is a diagram illustrating an example of a display screen of the measurement system. In the measurement system according to the present embodiment, a color difference ΔE and the like at the same measurement point of a final proof which is a print sample and a printed material to be delivered are determined in advance as a color evaluation reference value of printing.

When all measurement values at a plurality of measurement points at which the operator wants to check the colors of a test printed material are within an allowable range (a range corresponding to the color evaluation reference value) (within determination criteria), the completion of print preparation (hereinafter also referred to as print adjustment) (the fact that printing can be performed within the range of the color evaluation reference value) is notified via character information or audio information, and the measurement values are output as color quality evaluation certificates. When the measurement points are outside the determination criteria, the fact that the measurement points are outside the criteria is notified in the same manner as above.

Since the test printed material is a state on which ink is not dried yet, the color may be different from that of a printed material to be delivered, and a change in color occurring during drying is referred to as dry-down. The dry-down occurs when the density or color of ink after printing changes with drying.

Besides to this, surface processing (varnishing, PP pasting, or the like) may be performed on the printed material after printing, and such surface processing may cause changes in the color of the printed material. In the measurement system of the present embodiment, by taking these facts into consideration, an estimation value is obtained from the measurement value, and the colors after dry-down or surface processing is estimated using the estimation value as a predicted measurement value.

That is, a profile or a color table (2 or 3-dimensional table) indicating the results of the changes in color is created. Alternatively, the amount of changes is digitized as an estimation value using coefficients of the changes in color in relation to contrast or density of color. It is determined whether this estimation value is within an allowable range of color difference between the reference image and the final proof. When the estimation value is within the allowable range, a notification or the like indicating the completion of print preparation is output to inform the operator.

Moreover, the color of the printed material may be measured after several hours or during delivery when the colors are stabilized after printing (dry-down), and the actual measurement value may be compared with the estimation value of dry-down to obtain a difference value thereof. Automated learning may be performed using the difference value as a new dry-down factor to create a new color table or correct the color variation coefficient. In this manner, it is possible to increase the accuracy of the dry-down factor for the same sheet and ink.

Further, by recording the color measurement time and the time at which the completion of print preparation is notified on a log, the time at which color measurement was actually performed can be recorded as a color quality evaluation certificate. Furthermore, the information indicating the completion of print preparation may be input to a terminal of an MIS (management information system). Moreover, it is possible to report the progress state of a printing process in real-time without performing expensive upgrading or mounting an interface on the printing press.

Even when slightly different color reproduction occurs in the same type of sheet, a new profile and a new color conversion table may be created similarly for a new sheet. By such a learning function, there is no need to specifically perform test printing to obtain the dry-down factor.

Moreover, it is also possible to output a color quality evaluation certificate including the information on the changes in color after the changes due to the dry-down factor and the surface processing. The start time of print adjustment and the time at which the completion of print adjustment is notified may be recorded as time stamps and may be used as information for managing the adjustment operation period.

As an example of the above process, first, as illustrated in FIG. 19, the colors of the same measurement points of the final proof and the printed material are measured (step S220) to obtain measurement values such as L*a*b* values or a color difference ΔE of the measurement points. Subsequently, the measurement values are converted according to a color conversion table that predicts changes due to dry-down or the like as described above (step S222) and an estimation value of the changes in color is calculated (step S224).

Subsequently, the estimation value is compared with a color evaluation reference value to determine whether the estimation value is within an allowable range (step S226). If the estimation value is within the allowable range (Yes in step S226), the completion of print preparation is notified (step S228). If the estimation value is outside the allowable range (No in step S226), the fact that the value is outside the criteria is notified (step S230). The notification of the completion of print preparation is realized, for example, as illustrated in FIG. 20, by displaying a button 512 indicating that preparations for printing are completed and printing is available or displaying an evaluation result page 511 on a color evaluation screen 510.

[Ninth Embodiment]

Figure 21:
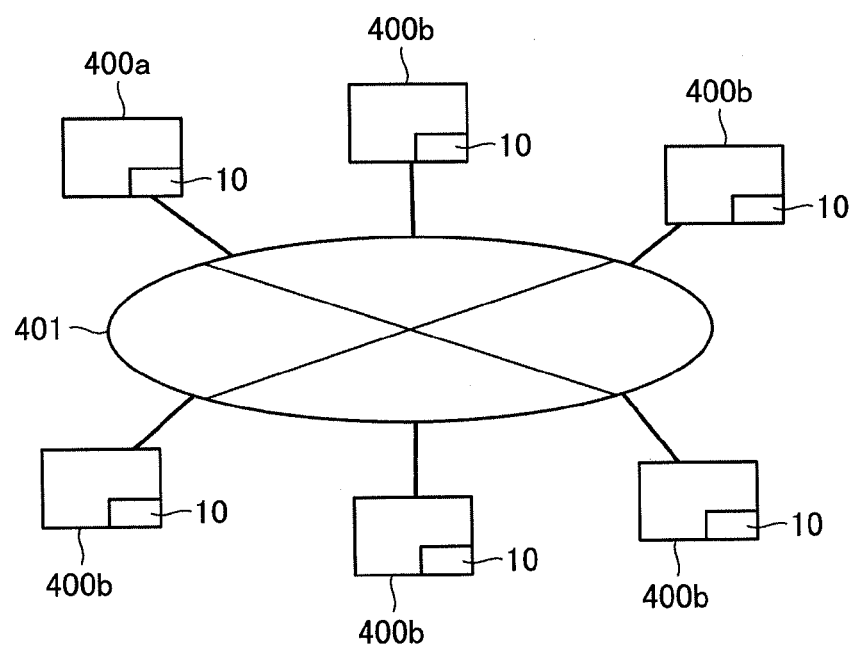
FIG. 21 is a diagram illustrating a measurement system according to a ninth embodiment of the present invention.
Figure 22:
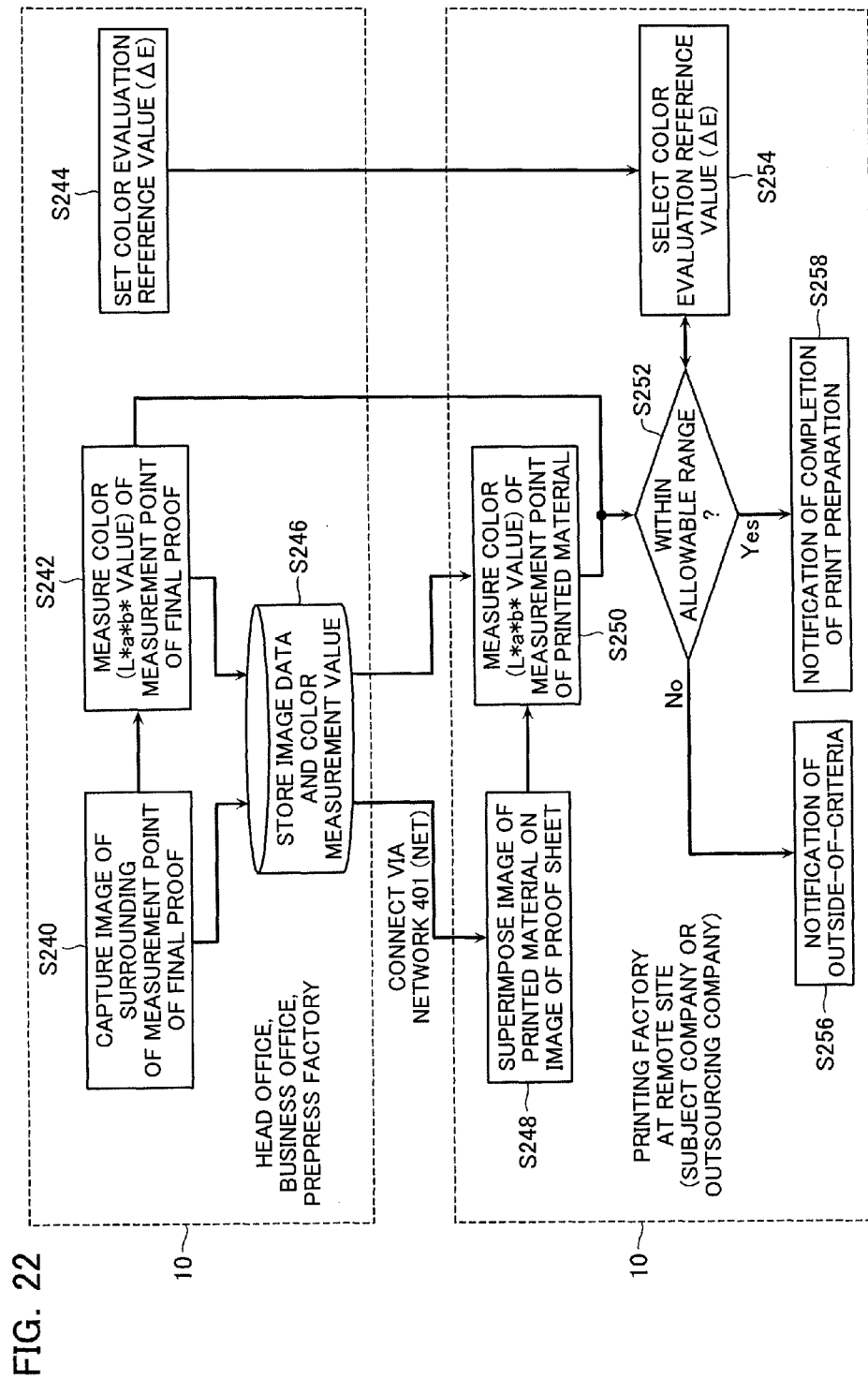
FIG. 22 is a diagram illustrating the measurement system.

FIGS. 21 and 22 are diagrams illustrating a measurement system according to a ninth embodiment of the present invention. As illustrated in FIG. 21, the measurement system according to the present embodiment includes a plurality of information processing devices 400a and 400b connected to each other via a network 401. At least one information processing device 400a of the plurality of information processing devices 400a and 400b has the function of a server, and the other information processing device 400b has the function of a client. The information processing device 400a includes a measuring instrument 10 and transmits color proof data such as a final proof to the information processing device 400b together with still image information. The information processing device 400b also includes the measuring instrument 10, aligns the continuous image information obtained by the measuring instrument 10 with the still image information transmitted from the information processing device 400a via the network 401, compares the transmitted color proof data and the measurement value, and performs color evaluation and adjustment.

According to this measurement system, it is possible to establish a printing process and a printing system more promptly. For example, when a head office is located far away from a printing factory, according to the conventional art, since the head office sends print jobs after obtaining permission for color proof from a customer, it is difficult to perform printing promptly. In the measurement system according to the present embodiment, since the head office transmits the images and the measurement data of a measurement point of which the colors are to be matched in particular, it is possible to start printing promptly. Further, in the conventional art, the color difference and the color correction data, which are adjusted by the eyes of an operator, are digitized, and color adjustment navigation can be performed based on the digitized values. Although in principle, color comparison is performed by one measuring instrument 10 in order to compare colors accurately, in the present measurement system, by using an adjustment method to be described below, it is possible to compare colors using different measuring instruments 10 having the same performance between networks and to improve the color measurement accuracy.

By using this measurement system, it is possible to further shorten the time required for the printing process and to accumulate color proof data (proof data) such as a final proof into a server to transmit the proof data to a remote printing site (printing factory or the like) appropriately in each printing step that requires proofing or to allow the printing site to access to the server and output a proof print. This is referred to as "remote proof." However, in this remote proof, in order to perform accurate color management so that printers and the like at the respective printing sites output the proof print in the same color, considerably frequent calibration operations are required.

In the conventional art, sensory evaluation by the human eyes is the only method of allowing the operator and the customer to check whether the images are output in the same color. In the present measurement system, by measuring colors in the same measurement point of a "final contract proof" and a "printed test sheet" using the measuring instrument 10, it is possible to easily check whether the printed sheet is printed in the same color as the final contract proof transmitted from the information processing device 400a (server). Thus, it is possible to execute frequent calibration operations with high efficiency without requiring special functions.

In order to further shorten the time required for the printing process and to reduce the cost, soft proof may be used. The soft proof is also referred to as monitor proof and is a scheme in which a proof image is displayed using a wide-gamut monitor corresponding to Adobe RGB having a wider gamut than sRGB to calibrate the monitor screen so that the color of the printed material is reproduced in the same color as the display color of the monitor in each printing step.

However, in the soft proof, it is difficult to compare the colors of the printed material and the monitor. In the present measurement system, using the measuring instrument 10, it is possible to easily check whether the color of any measuring point of the printed material is printed in the same color as the final contract proof using the monitor screen as an image proof color sample.

The remote proof using the soft proof is referred to as network proof. In the network proof using the present measurement system, by accurately measuring the colors of the same measurement point of at least two measurement targets such as a final proof and a printed material, it is possible to accurately check the color difference based on the L*a*b* values and ΔE or the L*, a*, and b* values as well as to compare the colors of the soft proof and the printed material with the naked eyes.

The network proof that facilitates the color management in a printing factory or an outsourcing printing company at a remote site is performed as illustrated in FIG. 22. First, the measuring instrument 10 in a head office, a business office, a prepress factory, or a factory captures the image of the surroundings of a measurement point of a final proof (step S240) to measure the colors of the measurement point of the final proof (step S242), and the server stores the image data and the color measurement value as electronic data (step S246). The color evaluation reference value described above and the like are set separately (step S244).

The electronic data is sent to the measuring instrument 10 in a printing factory at a remote site or the like via the network 401, and the image of the printed material captured by the measuring instrument 10 is superimposed on the image of the final proof (step S248) to measure the colors of the measurement point of the printed material (step S250). Subsequently, it is determined whether the color measurement values of the final proof and the printed material are within the allowable range (step S252). The color evaluation reference value or the like set by the measuring instrument 10 in a prepress factory or the like may be included in the electronic data of the job information, and in step S252, the measuring instrument 10 in a printing factory or the like may select the color evaluation reference value or the like (step S254) and make determination.

In the measuring instrument 10 in a printing factory or the like, when the measurement value is within the allowable range (Yes in step S252), the completion of print preparation is notified in the above-described manner (step S258). When the measurement value is outside the allowable range (No in step S252), the fact that the value is outside the criteria is notified (step S256). In this manner, by using the measuring instrument 10 of the same model or having the same performance as the prepress factory on the printing factory side, it is possible to measure and compare accurately the colors of the same measurement point of the "final proof" and the "printed test sheet" in addition to comparing of the colors of the images of the soft proof and the printed material with the naked eyes. In this way, since printing can be started on the printing factory side without waiting for the arrival of the final proof, it is possible to improve the operation efficiency of the printing press. Moreover, in a printing factory or the like at a remote site, the remote proof function enables the proof cost to be reduced when proofs or the like are output in the conventional manner.

The present measurement system is ideally suitable, for example, when a newspaper publishing company has a plurality of printing factories far away from the head office or places orders to a plurality of printing companies. For example, a national newspaper publishing company distributes a plurality of printing factories or the like over the entire country. In particular, although a color advertisement page of a newspaper is sent to the respective printing factories after color final proof from advertising companies are collected in a production department or an advertisement department of the newspaper company, the reproduced colors may be different from one printing factory to another.

Moreover, a final proof has been used as a reference for color reproduction of newspaper advertisement. However, at present, color matching is performed between the advertisement department and the printing factory based on the soft proof using monitors. However, since the colors of the monitor and the printed material are compared with the naked eyes, it is difficult to determine whether the color is good or bad, and there is a still problem in color reproduction.

In the present measurement system, first, on the advertisement department side, a spectrophotometer or the like of the measuring instrument 10 measures the colors of an important picture portion of a newspaper advertisement in L*a*b* values or the like. Subsequently, the image of the surroundings of the measurement point is recorded using a camera or the like mounted on the measuring instrument 10, and the image data and the measurement value are transmitted to the respective printing factories and the like.

In the respective printing factories and the like, the measurement point of the same picture portion of the printed material extracted at the start of printing is automatically or manually aligned with the measurement point of the final proof using the measuring instrument 10, and the color of the same point of the picture portion as the measurement point of the final proof can be measured accurately. Moreover, by using an ICC profile created based on the measured L*a*b* values under the printing conditions and a color conversion engine (CMM: color matching method), the CMYK ink amounts can be represented as halftone dot % values.

By converting the difference between the L*a*b* values of the final proof and the printed material into the difference between the halftone dot % values, it is possible to predict the difference between ink amounts. By using the difference as a correction value for an ink key of a printing press, it is possible to reduce a color adjustment time of the printing press and to perform color adjustment in a shorter period than the conventional art. On the other hand, after converting the L*a*b* values into the halftone dot % values of the individual CMYK colors, by calculating the difference between solid density values using a table that converts the halftone dot % values into solid density values of the respective CMYK colors, it is possible to adjust the ink amount in the conventional method where the operator adjusts the ink amount while measuring the solid densities of the respective CMYK colors. As a common note according to the present invention, the L*a*b* values that indicate colors may be values of another color system depending on purposes.

As in the present measurement system, in a configuration where a plurality of measuring instruments 10 is used, regardless of whether the respective measuring instruments 10 are connected to the network 401, it is necessary to correct the image data and the measurement values obtained by the respective measuring instruments 10 together with device-unique parameters so as to match a reference measuring instrument 10 so as to eliminate variations in the image data and the measurement values.

That is, the reference measuring instrument 10 is set optionally, and error values in the measurement values between the plurality of measuring instruments 10 are corrected so as to match the measurement values of the reference measuring instrument 10. For example, the same color chart is measured in the reference measuring instrument 10 to obtain a difference from another measuring instrument 10 as a profile, and measurement is performed in the respective measuring instruments 10 using this profile.

Figure 23:
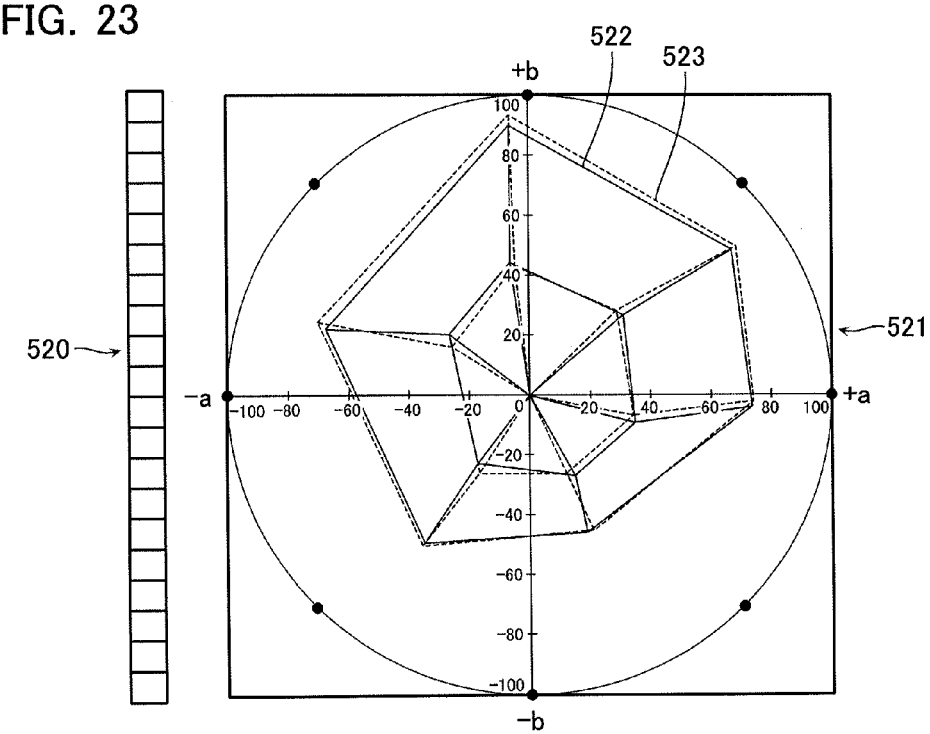
FIG. 23 is a diagram illustrating a difference in measurement values of respective measuring instruments of the measurement system.
Figure 24:
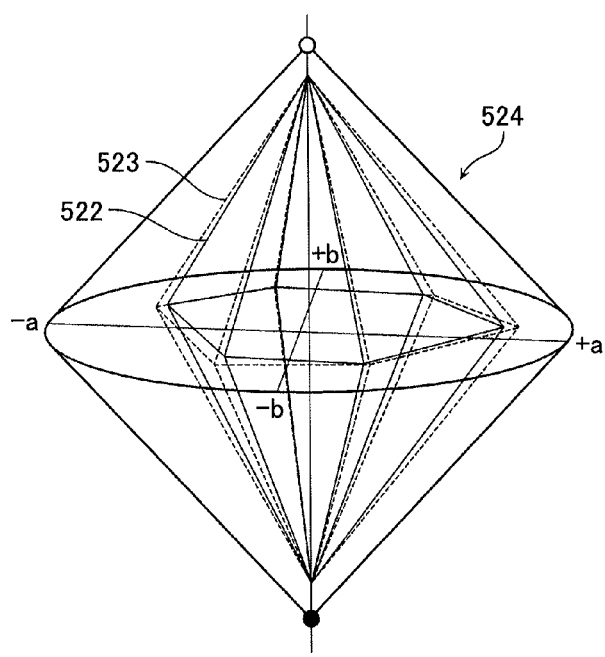
FIG. 24 is a diagram illustrating a difference in measurement values of respective measuring instruments of the measurement system.

FIGS. 23 and 24 are diagrams illustrating differences between the measurement values of respective measuring instruments 10 of a system that uses a plurality of measuring instruments 10. In FIG. 23, a difference between the measurement values 522 and 523 of the measuring instruments 10 based on a color patch 520 including primary colors, secondary colors, and gray and a CIELAB chromaticity diagram 521 is displayed for comparison on an a*b* values plane. In FIG. 24, a difference between the L*a*b* values of the color patch 520 is coordinate-converted on a color solid 524 that includes the L* value of the CIELAB chromaticity diagram 521 so as to suppress a color difference between the measuring instruments 10.

As illustrated in FIGS. 23 and 24, although an error due to individual difference occurs between the measurement values 522 and 523 of the reference measuring instrument 10 and the other measuring instrument 10, by using the error value as a profile and reflecting the same on other measuring instruments 10, the measurement can be performed so as to match the reference measuring instrument 10. However, as a premise, it is necessary to finish proofing of the reference measuring instrument 10 in advance. Moreover, all measuring instruments 10 may be measuring instruments of the same manufacture and having the same performance, and preferably, may be measuring instruments of different manufactures, in which an error is incorporated into a reference measuring instrument based on the ISO standards or the like.

That is, when measurement errors occur between the measuring instruments 10, it is difficult to guarantee color quality. Thus, when a small measurement error occurs, the color patches 520 having halftone dot percents of 100% (solid) and 50% (tint) including primary colors (cyan, magenta, and yellow), secondary colors (red, green, and blue), and black serving as the references of color reproduction of the printed material are measured by the reference measuring instrument 10 and the other measuring instrument 10. By adapting the distortion of the entire color solid 524 illustrated in FIG. 24 to the L*a*b* values of the reference measuring instrument 10, for example, it is possible to reduce the measurement errors between the measuring instruments 10.

Figure 25:
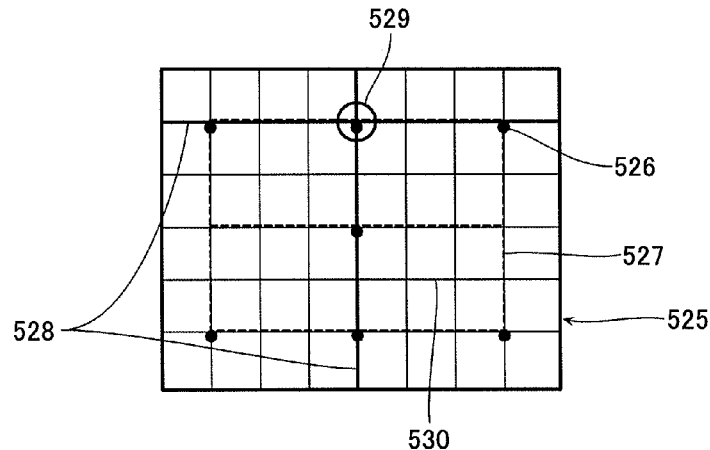
FIG. 25 is a diagram illustrating adjustment of a camera position in a measuring instrument of the measurement system.

The positional angle of the camera 16 of each measuring instrument 10 can be adjusted by employing the method of the sixth embodiment illustrated in FIG. 17. That is, in the measuring instrument 10 having the configuration illustrated in FIG. 17, first, the measuring instrument 10 is placed on a stand 1 that is integrated with a camera position positioning adjustment grid scale 2. In order to accurately place the measuring instrument 10 on the stand 1, the periphery of the measuring instrument body 19 may be fixed to the stand 1 by at least three fixing pins (not illustrated), for example. Subsequently, as illustrated in FIG. 25, the camera position positioning adjustment grid scale 2 is imaged by the camera 16 of each measuring instrument 10 to display an image 525 in which scale lines 530 are captured, and a digital reference frame 527 generated digitally is displayed so as to be superimposed on the image 525. The angle and height of the camera 16 are adjusted so that both images overlap. When the angles of view are different, the height of the camera 16 and the effective range of the image are adjusted by trimming.

When the camera position positioning adjustment grid scale 2 which is a subject and the optical axis of the camera 16 are not at the right angle, since a matrix frame of the displayed matrix screen in the image 525 appears to be distorted, the distortion may be corrected by performing image processing based on this. When distortion occurs, a message indicating that camera position adjustment is required is output.

Figure 26:
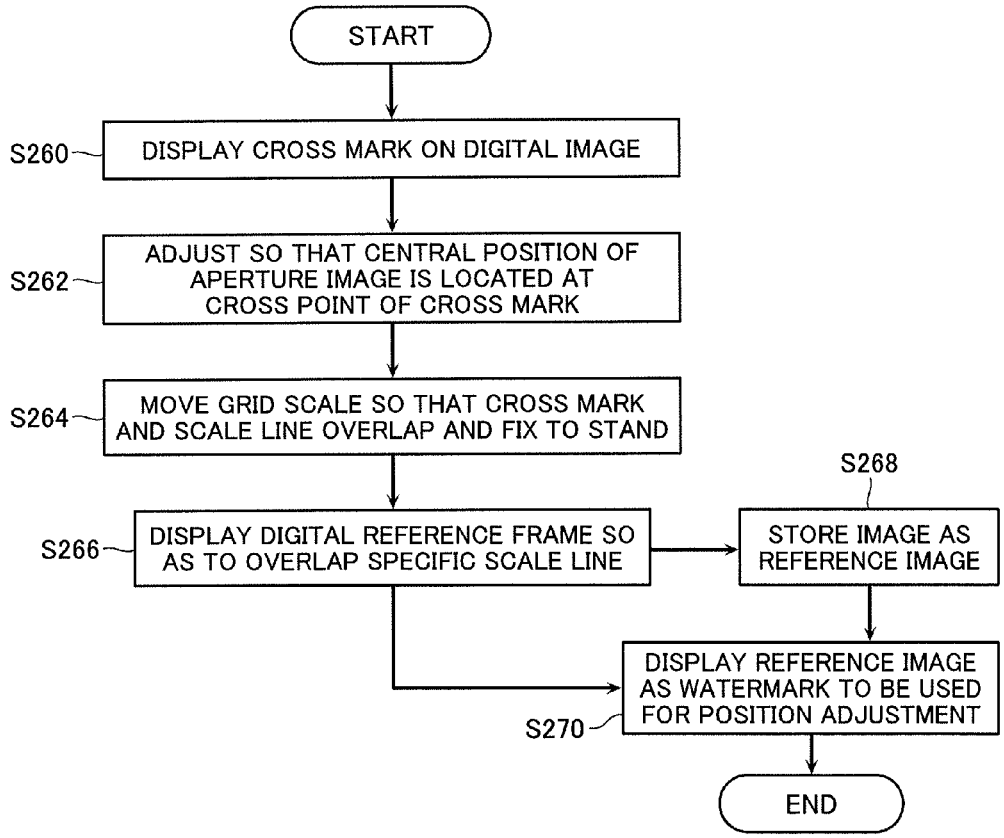
FIG. 26 is a flowchart illustrating the flow of a camera position adjustment process in the measuring instrument of the measurement system.

Subsequently, the adjustment of the position of the camera 16 will be described by taking the position of the camera 16 and the adjustment of the position of the measurement aperture 18 into consideration. As illustrated in FIG. 25, an aperture image 529 of the measurement aperture 18 is displayed on the image 525. In order to adjust the position of the camera 16 and the position of the measurement aperture 18, a cross mark 528 indicating the correct position of the measurement aperture 18, generated digitally is displayed so as to be superimposed on the image 252 to realize positioning. That is, as illustrated in FIG. 26, first, the cross mark 528 is displayed on a digital image captured by the camera 16 (step S260).

Subsequently, the position movement adjustment screw is adjusted to move the camera 16 to perform position adjustment so that the central position of the aperture image 529 is located at the cross point of the cross mark 528 which is generated digitally and which is the reference position (step S262). In this case, the positions are adjusted so that the attachment angles of the cameras 16 are not different. Since the position (XY coordinate) of the measurement aperture 18 is different depending on the type of the measuring instrument 10, the optimal reference position of the cross mark 528 is set in advance for each model.

The camera position positioning adjustment grid scale 2 is set under the camera 16, the camera position positioning adjustment grid scale 2 is moved so that a the cross mark 528 and a scale line 530 overlap each other while viewing the image of the camera 16, and the camera 16 is attached and fixed on the stand 1 (step S264).

After that, the digital reference frame 527 is displayed so as to overlap a specific scale line 530 (step S266), and the image is stored as a reference image (step S268). The image stored in this manner may be used for readjustment of the same measuring instrument 10, and the image is displayed as a watermark in other measuring instruments 10 and is used for position adjustment (step S270). In this way, the positions of the cameras 16 of the plurality of measuring instruments 10 can be accurately corrected, and all measuring instruments 10 can always perform measurement at the same measurement point.

As another method of eliminating mispositioning of the measurement positions of the plurality of cameras 16 without using a reference position adjustment jig such as the camera position positioning adjustment grid scale 2 or the like, about nine image correction reference points 526 as described in FIG. 25 may be imaged by the respective cameras 16 so as to match the reference camera 16, and the curve, size, or distortion of other images of the camera 16 may be automatically adjusted by digital processing.

Besides this, for example, the evaluation image is affected by an external illumination or the like during capturing of the camera 16, if the shadow formed on the image is different for every capturing, it is difficult to superimpose images with the naked eyes. Thus, for example, although the degree of superimposition is digitized so as to easily perform positioning, it is difficult to easily calculate the superimposition rate due to the influence of a shadow of the operator or an illumination.

Figure 27:
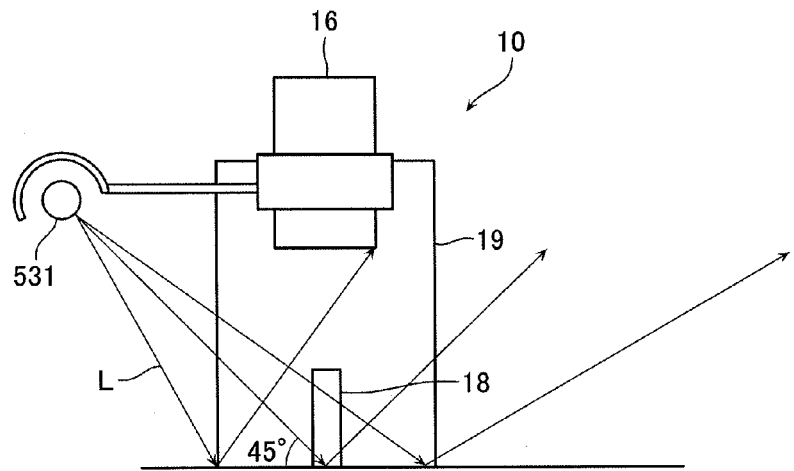
FIG. 27 is a diagram illustrating adjustment of a camera position in the measuring instrument of the measurement system.

In order to obviate this, as illustrated in FIG. 27, the measuring instrument 10 may have a configuration in which an illumination device 531 is mounted on the measuring instrument body 19, and an illumination beam L from the illumination device 531 is emitted at an angle of about 45° with respect to the measurement point of the camera 16 and the measurement aperture 18. In this case, the illumination beam from the upper part of the camera 16 reaches a printed material or the like, and the reflected beam thereof does not directly enter the camera 16 so that halation does not occur in the captured image. By capturing the reference image and the evaluation image using the camera 16 under an illumination environment where such conditions are constant, it is possible to facilitate an image superimposition operation and to shorten various adjustment periods related to the superimposition operation. Note that a method of superimposing phase images that are rarely affected by an illumination environment will be described later.

Besides this, in the measurement system according to the present embodiment, it is possible to individually manage the colors of the plurality of printing presses at a remote site. Specifically, a color measurement table of a color management section of a printing factory or the like and an image output section of a head office or the like are connected via a network. The image output section outputs print data and stores the same in a server. In the printing factory, a printing plate is output from the print data, and color matching is performed based on a final proof.

That is, first, a print operator or a quality manager of the printing factory measures the colors in the same picture surface of the final proof and a test printed material to obtain color difference. A profile from the color measurement data and a combination of ink and sheet in the printing press and printing press information such as temperature, humidity, or print rotation speed are transmitted to the color management section via the network. In the color management section, correction information of the print data is extracted based on the color difference of the picture surface and is used as a correction value of the subsequent print data. The corrected print data is used in the subsequent printing, and in the printing factory, a printing plate is output and printed based on the corrected print data. After that, the colors of the same picture surface of the final proof and the test printed material are measured to obtain a color difference which is fed back again. By repeatedly performing such operations, it is possible to learn print correction amounts for various printing conditions of the individual printing presses and to obtain optimal print data.

In the conventional art, the color reproduction characteristics of a print output device such as a printing press are obtained as a profile to maintain the color reproduction to be constant in another print output system in which conditions such as coloring material, a print medium, or the structure of an output device are different. However, practically, variations occur in the color reproduction due to a daily variation in the output device and a change of the lots of coloring materials and print media supplied.

Thus, as in the present measurement system, by digitizing a difference or a variation in the color reproduction of the printing presses such as individual output devices connected via the network 401, it is possible to correct the original data before printing and after digitizing and to stabilize and equalize the color reproduction of the printing presses.

Specifically, as described above, when the measurement values of the reference color patches having halftone dot percents of solid and 50% and the picture portion near the patches are within an allowable range, the information processing device 400b in a printing factory or the like feeds back the measurement value data after ink adjustment and accurate measurement point information of the image data to the information processing device 400a of the prepress section. In this way, it is possible to always learn the characteristics of the printing press and to supply the optimal print data.

In this manner, by controlling the colors in a centralized manner, even when a printing press used immediately before starting printing is changed, a RIP system of the prepress system can provide optimal print data of individual printing presses and output a plate using a CTP.

In the case of printing conditions where the measurement values of the printed material greatly exceed the allowable range, a warning message indicating that it is necessary to create the ICC profile or the degree of necessity thereof may be displayed to the printing press to inform the information processing device 400a that performs color management in a centralized manner. In this way, when requests of similar printing conditions are received, information such as a warning for prompting creation of an ICC profile may be output.

[Tenth Embodiment]

Figure 28:
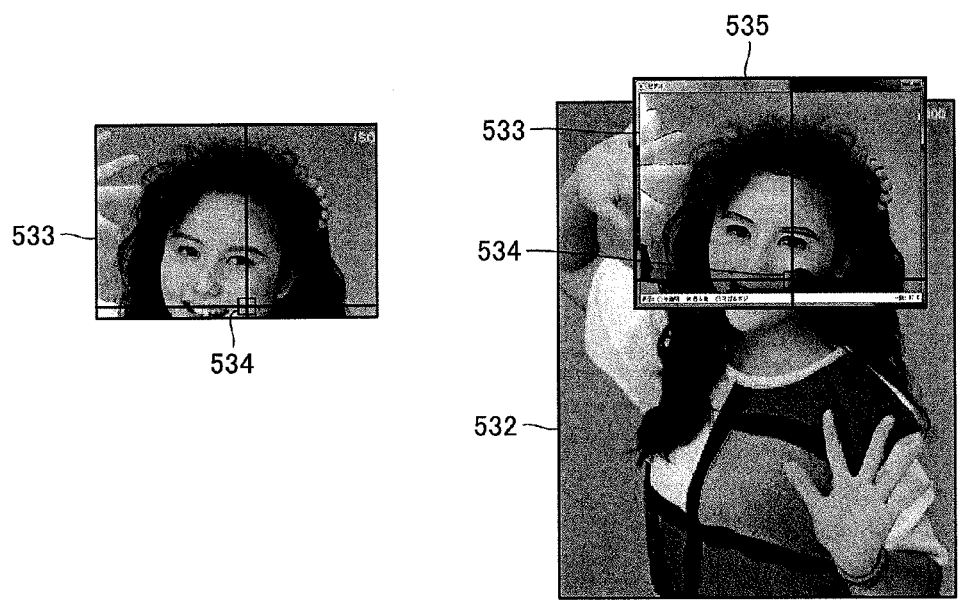
FIG. 28 is a diagram illustrating an example of a display screen of a measurement system according to a tenth embodiment of the present invention.
Figure 29:
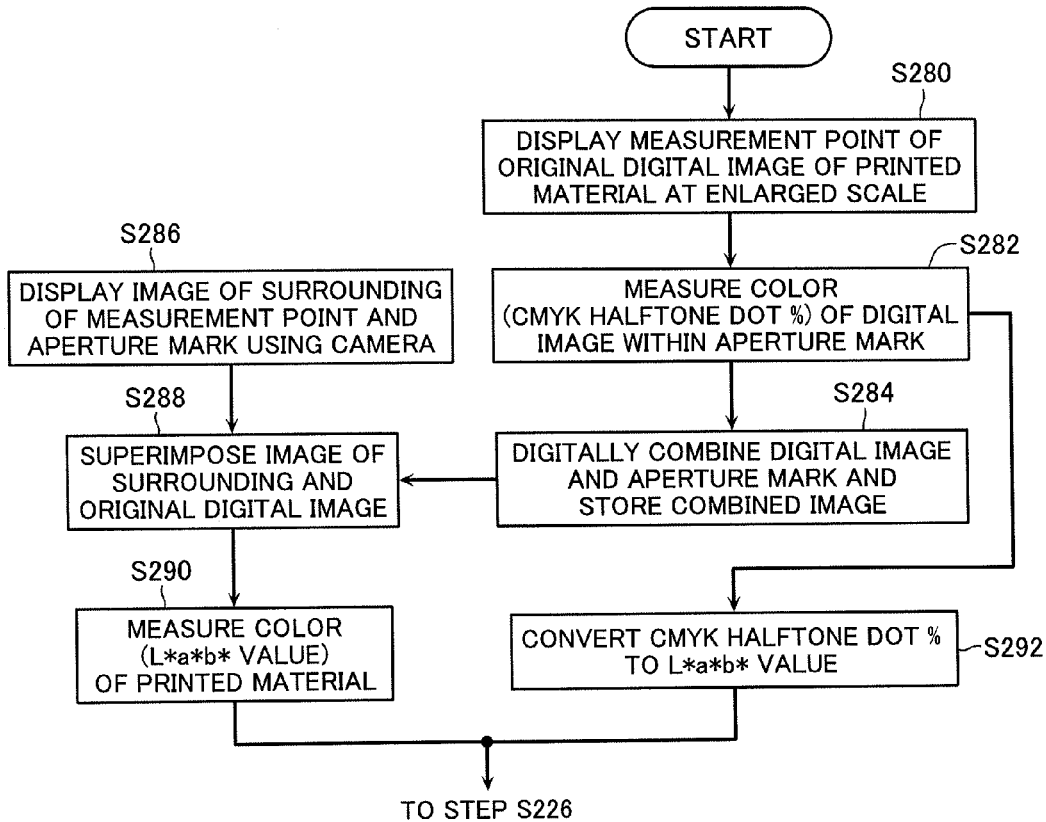
FIG. 29 is a flowchart illustrating the flow of a color evaluation procedure in the measurement system.

FIG. 28 is a diagram illustrating an example of a display screen of a measurement system according to a tenth embodiment of the present invention. FIG. 29 is a flowchart illustrating the flow of a color evaluation process of the measurement system. The measurement system according to the present embodiment uses image data such as PPF, TIFF, or PDF as a reference image and superimposes the reference image on an evaluation image acquired by the measuring instrument 10 measuring a final proof, a printed test sheet, or a printed material to be delivered so that the measurement points of the respective images are identical to the measurement points of the measuring instrument 10.

Specifically, as illustrated in FIG. 28, the resolution of the reference image 532 of the image data is matched to the resolution of the evaluation image 533 of the camera 16 mounted on the measuring instrument 10, these images are superimposed in the manner described in the first embodiment, and colors are compared using the measurement values obtained at the same measurement points.

When the digital reference image 532 and the evaluation image 533 obtained by capturing a printed material or the like are aligned, the resolutions and the dimensions of the images are adjusted to match each other as described above, and the dimension of the spot diameter of an aperture mark 534 of the measurement aperture 18 of the measuring instrument 10 is adjusted. In this way, it is possible to easily superimpose the image positions and to compare the colors of the exactly same measurement points. When the image of image data is composed of CMYK components, by using an ICC profile created under the same printing conditions, the same print colors can be obtained as values in the CIELAB color system.

Moreover, by superimposing a position positioning evaluation image captured by the camera 16 of the measuring instrument 10 and a digital reference image, it is possible to check the difference in the colors (color difference) between the measurement point measured on a printed material or the like and an original digital image of a printed material or the like. As illustrated in FIG. 29, in the color evaluation process, first, any measuring point of the original digital image of the printed material is displayed at an enlarged scale (step S280), the position of the aperture mark 534 is recorded on this image, and the colors of the digital image in the aperture mark 534 are measured (step S282) and are stored as the average value of the respective CMYK halftone dot percents %.

The digital image and the aperture mark 534 are combined to create an image and the image is stored (step S284). Subsequently, when the colors of the printed material are measured, the camera 16 displays the image of the surroundings of the measurement point and the aperture mark 534 as a watermark based on the original digital image of the printed material (step S286). The image of the surroundings and the original digital image are superimposed (step S288), and the colors of the evaluation image of the printed material are measured as L*a*b* values (step S290). In the superimposition process of step S288, the image that is actually displayed on the display screen is the range of a window 535 in FIG. 28.

The average value of the CMYK halftone dot percents % in the aperture mark 534 of the original digital image of the printed material stored in step S282 is converted to the L*a*b* value using the ICC profile of the printed material and a color conversion engine (step S292). After that, color evaluation is performed by the same processes as steps S226 to S230 using the L*a*b* value obtained in step S292 and the L*a*b* value obtained in step S290.

In this manner, by displaying the measurement point (coordinate) of the evaluation image of the camera 16 and the measurement point (coordinate) of the original digital image of the printed material, it is possible to perform image superimposition. When a slight shift occurs, for example, the measuring instrument 10 may manually adjust the position and may have a function of automatically detecting a positional shift.

As an example of the detection function, when the evaluation image is shifted to be positioned above the reference image, a blue line and a red line may be displayed respectively on the upper and lower side of the image displayed within the window 535. When the evaluation image is shifted to be positioned to the left side of the reference image, a blue line and a red line may be displayed respectively on the left and right sides of the image. In this manner, the measuring instrument 10 (and the PC 20) can recognize the positional shift. In this way, it is possible to measure the colors of the images at a correct measurement point in an accurate and quick manner.

[Eleventh Embodiment]

Figure 30:
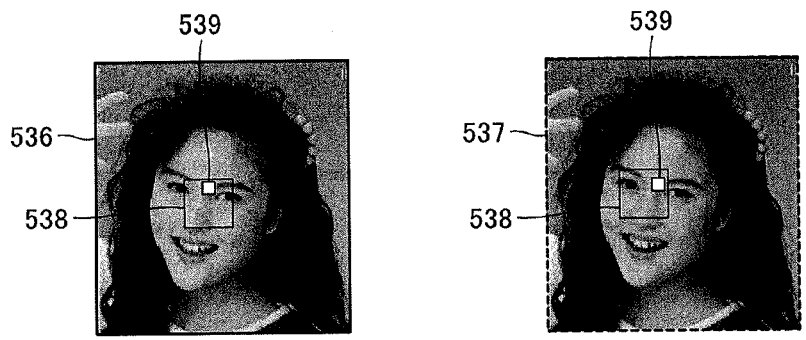
FIG. 30 is a diagram illustrating an example of positioning of images by a measurement system according to an eleventh embodiment of the present invention.

FIG. 30 is a diagram illustrating an example of positioning of images by a measurement system according to an eleventh embodiment of the present invention. In the measurement system according to the present embodiment, a digital image captured by the camera 16 is used as a reference image without using another optical measurement means different from the camera 16, a portion of the center, for example, of the image is used as a measurement point, and the image of the surroundings of the measurement point is used for positioning and superimposition with another digital image such as an evaluation image. In this manner, it is possible to obtain high color measurement accuracy and repeated measurement accuracy with a simple configuration.

A filter or a spectral filter having a wider gamut than a sRGB filter, or a CIEXYZ equivalent filter or the like is mounted on the camera 16, for example. Due to this, the captured evaluation image can be digitized directly as a high-precision L*a*b* image. However, in order to meet the specifications as the measuring instrument 10, only an image in a view angle range of about 1° to 10° (preferably 2°) is used for color measurement, and the image of the surroundings thereof is used for the superimposition process for comparing measurement values.

Specifically, as illustrated in FIG. 30, color measurement is performed using an image of a range 538 around a measurement point 539 within the reference image 536 and an image of the range 538 around a measurement point 539 within the evaluation image 537, and the respective images 536 and 537 are aligned using the images around these ranges 538. In this case, the measurement points of the respective images can be simultaneously measured by the measuring instrument 10 and the camera 16.

[Twelfth Embodiment]

Figure 31:
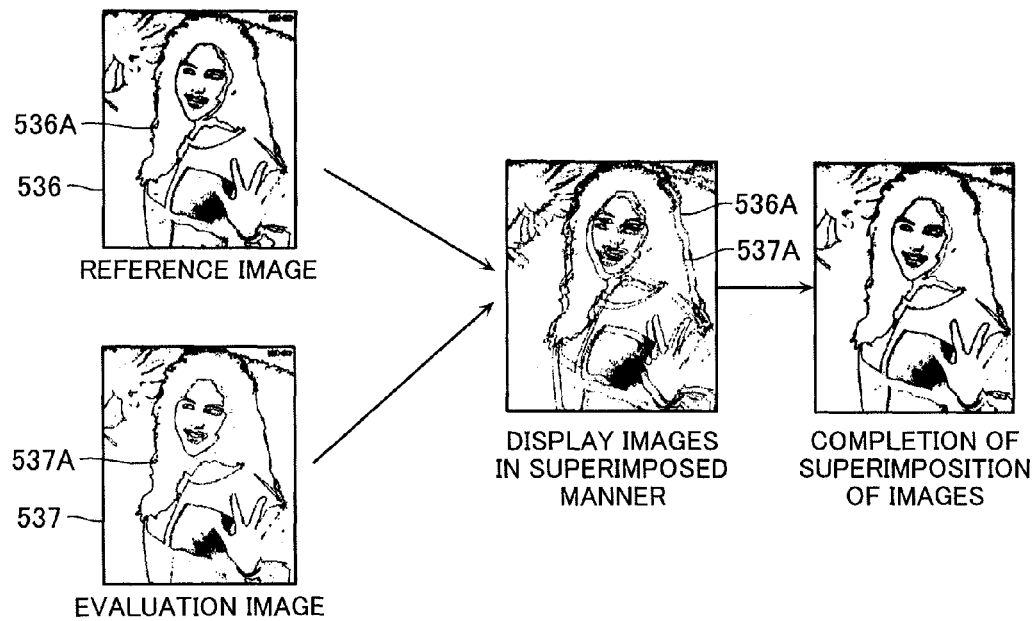
FIG. 31 is a diagram illustrating an example of positioning of images by a measurement system according to a twelfth embodiment of the present invention.

FIG. 31 is a diagram illustrating an example of positioning of images by a measurement system according to a twelfth embodiment of the present invention. In the measurement system according to the present embodiment, the spectrum of the reference image and the evaluation image is normalized by amplitude to extract only the phase components of the images, and a process of extracting feature points from the image is performed on the phase image to extract a border line, and an image superimposition process is performed using the border line.

As illustrated in FIG. 31, the border lines 536A and 537A of the reference image 536 and the evaluation image 537 are extracted, and the images are superimposed by superimposing these border lines. In this method, it is possible to reduce the influence of an illumination beam or the like and to reduce the amount of data of the images used for the superimposition process.

[Thirteenth Embodiment]

Next, a thirteenth embodiment will be described. The measurement system according to the present embodiment illustrates an example of processes when in the measurement system according to the ninth embodiment, it is determined in step S252 of FIG. 22 that the measurement values of the reference color patches having halftone dot percents of solid and 50% and the picture portion near the patches are within an allowable range (Yes in step S252). That is, when the measurement values are within the allowable range, the information processing device 400b transmits the color measurement data and the image data after ink amount adjustment to the information processing device 400a.

The information processing device 400a having received these items of data calculates solid density or predicted solid density of the ink of the respective colors with respect to a specific printing press from PDF or Tiff data to be printed and calculates correction amount data of a CTP curve or the like from a predicted dot gain curve.

The PDF and Tiff data for printing are corrected based on the print state data in the specific printing press obtained in this manner, and the feature amount which is the behavior of the color reproduction of a specific printing press is stored as correction data.

Additionally, in the information processing device 400a, the PDF and Tiff data to be printed later are corrected in advance based on these correction data and are transmitted to the information processing device 400b of a printing factory or the like as the corrected PDF and Tiff data to be printed. In this way, it is possible to reduce a print color adjustment time and the number of color adjustment times in a specific printing press.

In the measurement system according to the present embodiment, a printing company, a newspaper publishing company, or the like that include a plurality of printing presses of a certain scale or more store correction data for each ink and sheet used in the printing press and output a CTP printing plate from the PDF and Tiff data of print data obtained by correcting the original print data. In this manner, it is possible to perform color management of all printing presses in a simpler manner.

[Other Embodiments]

Besides this, a superimposition process for measuring the color of a picture is difficult in an image that constitutes a picture having a small change in color such as an image having a large gradation, for example. Thus, when the color of a first picture of a reference image is measured, a cross line (cross mark) is formed at the central point of a feature image such as a border line and the reference image and is recorded in the acquired image. Further, a superimposition point may be obtained by marking on a picture using a material or an illuminating method that does not allow the point to be visible in visible light but allows the point to be visible with an illumination using a specific wavelength.

Subsequently, when the camera 16 of the measuring instrument 10 has approached the same measurement point of the evaluation image, first, the measuring instrument 10 superimposes the evaluation image on the reference image by a software process such as an automated superimposition process at the position as it was. Moreover, the cross mark of the reference image is copied, and the copied cross mark is linked to the evaluation image. In this manner, the cross mark on the evaluation image and the cross mark on the reference image are at the same position. Subsequently, the function of automatically superimposing the evaluation image is turned off, and the cross mark acquired in the previous process is linked and displayed on the evaluation image. In this way, the measuring instrument 10 is moved so that the cross mark of the reference image and the cross mark of the evaluation image are superimposed, whereby it is possible to easily superimpose and match the respective images.

Moreover, during the color evaluation, a plurality of criterion values may be switchably displayed and evaluated. For example, according to CIE1976, although the standard of the color difference representing color evaluation criteria such as ΔE or CIEDE2000 is CIE1976 in the printing industry, since CIEDE2000 or the like is also known as the color difference standard that is close to the sense of the human eyes, any of the standards may be used.

The used color evaluation criteria are always described in the color quality evaluation certificate and the like so as to eliminate an error in color evaluation. Further, color evaluation criteria that use the L*u*v* color system or the RGB color system used in a monitor or the like, the Munsell color system used in paint or dye, and the Ostwald color system used in fashion, interior, and industrial design as standards may be selected.

In the above embodiments, although the reference medium and the evaluation medium such as the final proof and the printed material have been described as an example, the measurement system according to the present invention can be applied to various technical fields below, for example.

[Coating Measurement]

A coating surface of an object is used as a measurement target, and an entire image of the object is acquired from a camera or 2 or 3-dimensional measurement data. A color temperature and an illumination angle or an illumination method of one or a plurality of reference light sources are designated. An image capturing position and a measurement position and angle or the like are set. Measured color information of a reference coated material is stored together with border image data of the object using the reference coated material (for example, a picture or the like) as still image information. The number and the amount of paint colors to be coated is obtained from the L*a*b* value, the CMYK values, the feature colors, and the Munsell colors of the reference data based on the color measurement data. In actual painting, the images of the reference coated material and an evaluation coated material are aligned by a superimposition process under a reference light source and a reference light source illumination angle, and colors and associated items are measured and painting is performed. When a painting robot is used, successive positioning and successive comparison with reference data are performed using a video camera attached to the robot, and information is fed back to perform painting without making density uneven.

Moreover, a profile or a correction table may be created in advance from color differences during painting and drying, and the painting operation is performed based on simulation.

[Terrestrial or Astronomical Measurement]

The image including the surroundings of a terrestrial or astronomical measurement point is captured by an imaging unit. In this case, the imaging unit may be a video camera mounted on a communication satellite, an aircraft, or a telescope on the earth, a still camera capable of continuous shooting, or a laser image input device. The measurement value may be a ground temperature, the surface temperature of an astronomical body, a radiation amount, or topographic data. The measuring instrument may be a temperature sensor, a radiation dosimeter, a laser scanner, or an ultrasound scanner. It is possible to detect changes of the same location, to detect a landslide, a topographic change, a mineralogical change, a botanical change, a temperature change, or a radiation change, to detect positions where the scene of landscape is changed, and to create a new map.

[Terrestrial Measurement 2]

The GPS (global positioning system) position information may be used in place of the imaging unit that captures a terrestrial image. For example, a GPS receiver measures the measurement position on the ground. When the same position is measured by an aircraft, a satellite, or the like, the image of a map, a topology, or a building around the position measured by the GPS receiver is compared with a terrestrial image which is captured by an image conversion processor from the data that is input from a camera or acquired by sensors or the like and which is to be measured. In this way, the measurement position on the ground is determined. In this case, instead of the imaging unit, a coordinate position acquisition means and a reference image acquisition means for acquiring the neighboring image of the measurement value from the coordinate position acquired by the coordinate position acquisition means as a reference image with the aid of a database may be used. The same position on the ground may be measured using first GPS data and the data indicating a direction, an angle, a distance, and a shape and second GPS data and the data indicating a direction, an angle, a distance, and a shape, and the same items of data may be compared and evaluated.

[Medical Measurement]

A partial image of a subject may be captured by a microscope, and at the same time, the presence of microscopic organisms, viruses, cancer cells, or the like is examined from the image or with the aid of sensors. The image of the same portion is captured and measured after elapse of a predetermined period, and both images are compared according to a nonlinear conversion method. The structural change in the cross-sectional image obtained from a CT apparatus, an MRI apparatus, or the like is captured as data indicating a lesion progress state by scanning continuously or every predetermined period. The image of the same portion is captured and measured after elapse of a predetermined period, and both images are compared. A change between these images is extracted and is displayed in a different color or the like on the first or second image, or a diagnosis result obtained in advance is displayed.

[Object Measurement]

The shape of a reference 3-dimensional object (reference object) is imaged by two or more cameras, and a solid image is created from these images in real-time or after a predetermined period using a computer. One or a plurality of specific points is selected from the solid image, and the colors of the selected points are measured to obtain data. Moreover, the shape of a 3-dimensional object (comparative object) to be compared is imaged using two or more cameras, and a solid image is created from these images in real-time or after a predetermined period using a computer. One or a plurality of specific points is selected from the solid image, and the colors of the selected points are measured to obtain data. The images of the selected points of the reference object and the comparative object are superimposed. The color difference of a selected portion is calculated from the color measurement data of one or a plurality of points to make color difference determination. In this case, rather than using two or more cameras, one camera may be moved to the positions of the plurality of cameras to create the 3-dimensional image. Various physical quantities such as illuminance, temperature, and humidity of the same position may be measured using the imaging unit, and after elapse of a predetermined period, the image or the position information of the same position may be captured and the data thereof may be compared.

[Heat and Radiation Gamma Measurement]

A heat or radiation ray measuring instrument may include an imaging unit that captures an image of a measurement target in the event of a fire, a disaster, or a physical or chemical abnormality and a sensor detecting unit that detects heat rays or radiation rays of the measurement target, in which an image capturing unit of the imaging unit captures the surroundings of the sensor detecting unit. The images captured by the heat ray or radiation ray measuring instrument and the detected data are recorded and displayed in correlation, and the images of the same position are captured and measured in a time-sequential manner so that the images can be compared simultaneously.

REFERENCE SIGNS LIST

10: Measuring instrument
11: Lens unit
12: Spectroscopic unit
13: Control unit
14: Input and output I/F
15: Light source
16: Camera
20: PC
21: Control unit
22: Display unit
23: Input unit
24: Memory
100: Measurement system

The invention claimed is:

1. A measurement system comprising:
a measuring instrument that detects a physical quantity at any measuring point of a measurement target and images at least surroundings of the measurement point in the measurement point of the measurement target and the surroundings of the measurement point in real-time to obtain continuous image information and outputs the continuous image information;
a storage unit that inputs the continuous image information output from the measuring instrument and stores the continuous image information as still image information together with measurement values based on the physical quantity detected by the measuring instrument;
an image processing unit for displaying the continuous image information output from the measuring instrument and the still image information stored in the storage unit in a superimposed manner for image matching; and
a display unit that displays the continuous image information and the still image information superimposed for image matching by the image processing unit.

2. The measurement system according to claim 1, wherein the measuring instrument includes:
a measuring and detecting unit that detects the physical quantity at any measuring point of the measurement target; and
an imaging unit that images at least the surroundings of the measurement point in the measurement point of the measurement target and the surroundings of the measurement point in real-time to obtain the continuous image information and outputs the continuous image information.

3. The measurement system according to claim 1, wherein the measuring instrument includes:
an imaging unit that images at least the surroundings of the measurement point in the measurement point of the measurement target and the surroundings of the measurement point in real-time to obtain the continuous image information and outputs the continuous image information; and
a measuring and detecting unit that detects the physical quantity at the measurement point from the continuous image information obtained by the imaging unit.

4. The measurement system according to claim 1, wherein the measuring instrument includes a measurement value calculating unit that calculates the measurement values from the detected physical quantity, and
the measurement system includes an evaluating unit that evaluates the measurement target using the measurement values stored in the storage unit and the measurement values calculated by the measurement value calculating unit based on the detected physical quantity of the measurement point when the continuous image information and the still image information are displayed in the superimposed manner for image matching.

5. The measurement system according to claim 1, wherein the display unit displays entire image information of the measurement target and information indicating the measurement point in the entire image information, and
the storage unit stores the measurement values at the measurement point and the information indicating the measurement point in correlation with the still image information.

6. The measurement system according to claim 1, wherein the image processing unit displays reference positioning information so as to be superimposed for image matching on the continuous image information and the still image information.

7. The measurement system according to claim 1, wherein the image processing unit displays the continuous image information and the still image information in different colors and displays a matched image portion thereof in another color.

8. The measurement system according to claim 3, wherein the measuring and detecting unit detects the physical quantities in a predetermined range of the measurement point from the continuous image information obtained by the imaging unit.

9. The measurement system according to claim 4, wherein the measurement system includes a determining unit that determines whether a difference value between the measurement value calculated by the measurement value calculating unit and the measurement value stored in the storage unit satisfies predetermined determination criteria based on the result of evaluation of the evaluating unit.

10. The measurement system according to claim 9, wherein
the determining unit determines whether an estimation value obtained by converting the difference value based on a predetermined color conversion table satisfies the determination criteria, and
the display unit displays information indicating the determination results from the determining unit.

11. The measurement system according to claim 4, wherein
the evaluating unit evaluates the measurement target using a measurement value that is calculated by the measurement value calculating unit every predetermined period or continuously and the measurement value stored in the storage unit based on a variation over time in the physical quantity.

12. The measurement system according to claim 1, wherein
the measuring instrument includes a correcting unit that corrects device-unique parameters that affect measurements.

13. A measurement position positioning method using a measurement system comprising:
a measuring instrument that detects a physical quantity at any measuring point of a measurement target and images at least surroundings of the measurement point in the measurement point of the measurement target and the surroundings of the measurement point in real-time to obtain continuous image information and outputs the continuous image information;
a storage unit that inputs the continuous image information output from the measuring instrument and stores the continuous image information as still image information together with measurement values based on the physical quantity detected by the measuring instrument;
an image processing unit for displaying the continuous image information output from the measuring instrument and the still image information stored in the storage unit in a superimposed manner for image matching; and
a display unit that displays the continuous image information and the still image information superimposed for image matching by the image processing unit, the method comprising:
employing the measuring instrument to measure a first measurement point of a first measurement target to obtain a first measurement value;
employing the measuring instrument to image at least surroundings of the first measurement point in the first measurement point and the surroundings of the first measurement point in real-time and store the same in the storage unit as the still image information together with the first measurement value;
employing the measuring instrument to image at least surroundings of a second measurement point in the second measurement point of a second measurement target and the surroundings of the second measurement point and acquire the same as the continuous image information;
employing the image processing unit to superimpose the continuous image information on the still image information in real-time and display the same on the display unit; and
employing the measuring instrument to measure the second measurement point of the second measurement target to obtain a second measurement value.

14. The measurement position positioning method according to claim 13, further comprising:
generating a database in which a plurality of first measurement values and a plurality of items of still image information are correlated for the first measurement target and storing the database in the storage unit, wherein
the step of superimposing the continuous image information on the still image information and displaying the same on the display unit involves reading the first measurement value and the still image information corresponding to the second measurement point of the second measurement target from the database and superimposing the still image information on the continuous image information.

15. A measurement position positioning program using a measurement system comprising:
a measuring instrument that detects a physical quantity at any measuring point of a measurement target and images at least surroundings of the measurement point in the measurement point of the measurement target and the surroundings of the measurement point in real-time to obtain continuous image information and outputs the continuous image information;
a storage unit that inputs the continuous image information output from the measuring instrument and stores the continuous image information as still image information together with measurement values based on the physical quantity detected by the measuring instrument;
an image processing unit for displaying the continuous image information output from the measuring instrument and the still image information stored in the storage unit in a superimposed manner for image matching; and
a display unit that displays the continuous image information and the still image information superimposed for image matching by the image processing unit, the program causing a computer to execute:
inputting a first measurement value obtained by the measuring instrument measuring a first measurement point of a first measurement target;
inputting the consequence image information obtained by the measuring instrument imaging at least surroundings of the first measurement point in the first measurement point and the surroundings of the first measurement point and storing the continuous image information in the storage unit as the still image information together with the first measurement value;
inputting the consequence image information obtained by the measuring instrument imaging at least surroundings of a second measurement point in a second measurement point of a second measurement target and the surroundings of the second measurement point;
employing the image processing unit to superimpose the continuous image information on the still image information in real-time and display the same on the display unit; and
employing the measuring instrument to measure the second measurement point of the second measurement target to obtain a second measurement value.

16. A measuring instrument that is connectable to a computer, comprising:
a measuring instrument body including a measuring and detecting unit that detects a physical quantity at any measuring point of a measurement target;

an imaging unit attached to the measuring instrument body integrally or by fixing means so as to image at least surroundings of the measurement point in the measurement point of the measurement target and the surroundings of the measurement point to obtain continuous image information and output the continuous image information; and an interface unit that outputs the physical quantity detected by the measuring and detecting unit or the measurement value obtained from the physical quantity to the computer together with the continuous image information.

17. A measurement system comprising:

a measuring instrument that detects a physical quantity at any measuring point of a measurement target and images at least surroundings of the measurement point in the measurement point of the measurement target and the surroundings of the measurement point in real-time to obtain continuous image information and outputs the continuous image information;

a storage unit that stores still image information together with a physical quantity to be measured;

an image processing unit for displaying the continuous image information output from the measuring instrument and the still image information stored in the storage unit in a superimposed manner for image matching; and a display unit that displays the continuous image information and the still image information superimposed for image matching by the image processing unit.

18. A measurement system comprising:

a first information processing device and a second information processing device connected via a network, the first information processing device comprising:

a storage unit that stores still image information together with a physical quantity; and a transmitting unit that transmits the still image information and the physical quantity stored in the storage unit to the second information processing device via the network, and the second information processing device comprising:

a measuring instrument that detects a physical quantity at any measuring point of a measurement target and images at least surroundings of the measurement point in the measurement point of the measurement target and the surroundings of the measurement point in real-time to obtain continuous image information and outputs the continuous image information;

a receiving unit that receives the still image information and the physical quantity transmitted from the first information processing device;

an image processing unit for displaying the continuous image information output from the measuring instrument and the still image information received by the receiving unit in a superimposed manner for image matching; and a display unit that displays the continuous image information and the still image information superimposed for image matching by the image processing unit.

19. The measurement system according to claim 18, wherein the second information processing device includes an evaluating unit that evaluates the measurement target based on the physical quantity transmitted from the first information processing device and the physical quantity detected by the measuring instrument when the continuous image information and the still image information are superimposed for image matching by the image processing unit.

20. The measurement system according to claim 18, wherein the first information processing device stores a target physical quantity required as a physical quantity of the measurement target, the second information processing device transmits a physical quantity obtained by measuring the measurement target with the aid of the measuring instrument and parameters that affect the physical quantity to the first information processing device as profile data, and the first information processing device corrects the physical quantity that is transmitted from the first information processing device based on the profile data so that the obtained physical quantity measured by the measuring instrument approaches the target physical quantity and transmits the corrected physical quantity to the second information processing device.

* * * * *